(12) United States Patent
Son et al.

(10) Patent No.: US 9,591,597 B2
(45) Date of Patent: Mar. 7, 2017

(54) METHOD FOR INDICATING CONTROL CHANNEL IN WIRELESS ACCESS SYSTEM, AND BASE STATION AND USER EQUIPMENT FOR THE SAME

(71) Applicant: LG ELECTRONICS INC., Seoul (KR)

(72) Inventors: Hyukmin Son, Anyang-si (KR);
Jinmin Kim, Anyang-si (KR);
Seunghee Han, Anyang-si (KR);
Hyunwoo Lee, Anyang-si (KR);
Hyeyoung Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 14/358,015

(22) PCT Filed: Oct. 11, 2012

(86) PCT No.: PCT/KR2012/008271
§ 371 (c)(1),
(2) Date: May 13, 2014

(87) PCT Pub. No.: WO2013/081293
PCT Pub. Date: Jun. 6, 2013

(65) Prior Publication Data
US 2014/0307729 A1    Oct. 16, 2014

Related U.S. Application Data

(60) Provisional application No. 61/566,007, filed on Dec. 2, 2011.

(51) Int. Cl.
*H04W 56/00*    (2009.01)
*H04J 11/00*    (2006.01)
(Continued)

(52) U.S. Cl.
CPC ....... *H04W 56/001* (2013.01); *H04J 11/0056* (2013.01); *H04J 11/0069* (2013.01);
(Continued)

(58) Field of Classification Search
CPC ........... H04W 56/001; H04W 56/0015; H04W 36/0083; H04J 11/0056; H04J 11/0069; H04J 2211/001
See application file for complete search history.

(56) References Cited

U.S. PATENT DOCUMENTS

2009/0225824 A1    9/2009   Noh et al.
2010/0323647 A1* 12/2010   Ryu ................. H04W 52/0251
                                                   455/127.5

(Continued)

OTHER PUBLICATIONS

PCT International Application No. PCT/KR2012/008271, Written Opinion of the International Searching Authority dated Mar. 26, 2013, 9 pages.

*Primary Examiner* — Alpus H Hsu
*Assistant Examiner* — Anthony Luo
(74) *Attorney, Agent, or Firm* — Lee Hong Degerman Kang & Waimey

(57) ABSTRACT

A method for transmitting/receiving data in a wireless access system, and a base station (BS) and a user equipment (UE) for the same are disclosed. The method for performing synchronization with a neighbor base station (BS) of a user equipment (UE) in a wireless access system includes, if a user equipment (UE) based on a macro BS is located at a boundary of the neighbor BS, measuring a synchronization channel of the neighbor BS, wherein a subframe of the neighbor BS includes an additional secondary synchronization signal (SSS) so as to perform synchronization with the neighbor BS.

4 Claims, 24 Drawing Sheets

(51) Int. Cl.
*H04W 72/04* (2009.01)
*H04W 36/00* (2009.01)

(52) U.S. Cl.
CPC ... *H04W 36/0083* (2013.01); *H04W 56/0015* (2013.01); *H04W 72/0426* (2013.01); *H04J 2211/001* (2013.01)

(56) References Cited

U.S. PATENT DOCUMENTS

| | | |
|---|---|---|
| 2011/0013592 A1 | 1/2011 | Uemura et al. |
| 2011/0026413 A1* | 2/2011 | Swarts ................ H04J 11/0073 370/252 |
| 2011/0149947 A1 | 6/2011 | Kim et al. |
| 2011/0170496 A1* | 7/2011 | Fong ..................... H04L 5/0053 370/329 |
| 2011/0189998 A1* | 8/2011 | Joo ....................... H04W 24/00 455/444 |
| 2011/0206011 A1 | 8/2011 | Ishida et al. |
| 2011/0249611 A1* | 10/2011 | Khandekar ............ H04B 7/155 370/315 |
| 2011/0280223 A1* | 11/2011 | Maeda ................. H04W 72/082 370/335 |
| 2012/0113825 A1* | 5/2012 | Baglin ................. H04W 24/00 370/252 |
| 2012/0113843 A1* | 5/2012 | Watfa ................ H04W 72/1289 370/252 |
| 2012/0120821 A1* | 5/2012 | Kazmi .............. H04W 56/0005 370/252 |
| 2012/0201164 A1* | 8/2012 | Jongren ................ H04L 5/0048 370/252 |
| 2013/0044678 A1* | 2/2013 | Qu ..................... H04W 52/244 370/328 |

* cited by examiner

METHOD FOR INDICATING CONTROL CHANNEL IN WIRELESS ACCESS SYSTEM, AND BASE STATION AND USER EQUIPMENT FOR THE SAME

CROSS-REFERENCE TO RELATED APPLICATIONS

This application is the National Stage filing under 35 U.S.C. 371 of International Application No. PCT/KR2012/008271, filed on Oct. 11, 2012, which claims the benefit of U.S. Provisional Application No. 61/566,007, filed on Dec. 2, 2011, the contents of which are hereby incorporated by reference herein in their entirety.

TECHNICAL FIELD

The present invention relates to a wireless access system, and more particularly to a method for performing management in a heterogeneous cell using an Enhanced Physical Downlink Control Channel (ePDCCH), and an apparatus for supporting the same.

BACKGROUND ART

The most important one of requirements of a next-generation wireless access system is to support a high data transfer rate. To achieve this, various technologies such as Multiple Input Multiple Output (MIMO), Cooperative Multiple Point Transmission (CoMP), relay, etc. have been developed and studied.

Although downlink and uplink bandwidths are different from each other, a conventional wireless communication system typically uses one carrier. For example, a wireless communication system having one carrier for each of downlink and uplink and symmetry between downlink and uplink bandwidths may be provided based on a single carrier.

However, in order to guarantee a broadband bandwidth capable of satisfying a higher data transfer rate considering that frequency resources are saturated, carrier aggregation (CA)/multiple cells technology has been proposed, which is designed for each bandwidth to satisfy basic requirements capable of operating an independent system and aggregates a plurality of bandwidths using a single system.

In this case, a bandwidth-based carrier capable of being independently operated may be referred to as a component carrier (CC). In order to support the increasing transmission capacity, a bandwidth of the latest 3GPP LTE-A or 802.16m has been continuously extended up to 20 MHz or more. In this case, one or more component carriers (CCs) are aggregated to support a broadband. For example, provided that one CC supports a bandwidth of 5 MHz, 10 MHz or 20 MHz, a maximum of 5 CCs are aggregated to support a system bandwidth of up to 100 MHz.

DISCLOSURE

Technical Problem

Accordingly, the present invention is directed to a method for indicating a control channel in a wireless access system, and a base station (BS) and a user equipment (UE) for the same that substantially obviate one or more problems due to limitations and disadvantages of the related art. An object of the present invention is to provide a method and apparatus for smoothly transmitting/receiving UL/DL data between a base station (BS) and a user equipment (UE) in a wireless access system (preferably, a wireless access system supporting carrier aggregation).

Another object of the present invention is to provide a method for reducing the influence of interference encountered either between homogeneous networks or between heterogeneous networks, and a method and apparatus for operating/managing additional secondary synchronization signals (SSSs) used for reducing interference between a primary synchronization signal (PSS) and a secondary synchronization signal (SSS) in a heterogeneous network.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for performing synchronization with a neighbor base station (BS) of a user equipment (UE) in a wireless access system, the method including: if a user equipment (UE) based on a macro BS is located at a boundary of the neighbor BS, measuring a synchronization channel of the neighbor BS, wherein a subframe of the neighbor BS includes an additional secondary synchronization signal (SSS) so as to perform synchronization with the neighbor BS.

In another aspect of the present invention, a user equipment (UE) for acquiring synchronization with a neighbor base station (BS) in a wireless access system includes a processor configured to measure a synchronization channel of the neighbor BS, if a user equipment (UE) based on a macro BS is located at a boundary of the neighbor BS, wherein a subframe of the neighbor BS includes an additional secondary synchronization signal (SSS) so as to perform synchronization with the neighbor BS.

The additional SSS may be located in a subframe established as an almost blank subframe (ABS) in the macro BS.

At least one additional SSS may be transmitted within one subframe.

The additional SSS may be located in a subframe having no CRS (Common Reference Signal).

The additional SSS may be allocated to a fixed position, and include specific information indicating the presence or absence of the additional SSS.

A resource of the macro BS corresponding to a subframe for transmission of the additional SSS may be muted.

Advantageous Effects

Exemplary embodiments of the present invention have the following effects. In accordance with an embodiment of the present invention, UL/DL data can be easily communicated between a user equipment (UE) and a base station (BS) in a wireless access system (preferably, a wireless communication system capable of supporting carrier aggregation (CA)).

The embodiment of the present invention can transmit additional SSS signals capable of obviating the interference problem encountered between PSS and SSS in a heterogeneous network, so that it can efficiently obtain synchronization.

In accordance with the embodiment of the present invention, due to interference reduction, the user equipment (UE)

can improve a cell throughput and difficulty of UE implementation can be greatly reduced.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
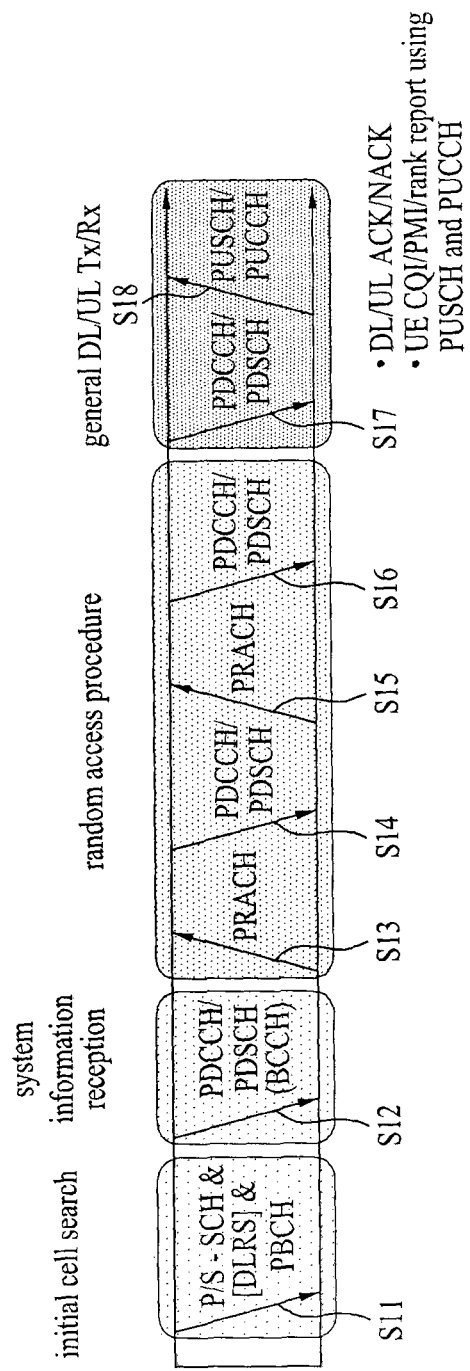
FIG. 1 is a conceptual diagram illustrating physical channels used in a 3GPP LTE system and a general method for transmitting a signal using the physical channels.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some cases, in order to prevent ambiguity of the concepts of the present invention, conventional devices or apparatuses well known to those skilled in the art will be omitted and be denoted in the form of a block diagram on the basis of important functions of the present invention.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point (AP) as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE.

For clarity, the following description focuses on the 3GPP LTE and 3GPP LTE-A system. However, technical features of the present invention are not limited thereto.

1. Overview of 3GPP LTE/LTE-A Systems Applicable to the Present Invention 1.1 Overview of System FIG. 1 is a conceptual diagram illustrating physical channels for use in a 3GPP system and a general method for transmitting a signal using the physical channels.

Referring to FIG. 1, when powered on or when entering a new cell, a UE performs initial cell search in step S11. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS.

Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After initial cell search, the UE may acquire more specific system information by receiving a Physical Downlink Control CHannel (PDCCH) and receiving a Physical Downlink Shared CHannel (PDSCH) based on information of the PDCCH in step S12.

Thereafter, if the UE initially accesses the BS, it may perform random access to the BS in steps S13 to S16. For random access, the UE may transmit a preamble to the BS on a Physical Random Access CHannel (PRACH) in step S13 and receive a response message for the random access on a PDCCH and a PDSCH corresponding to the PDCCH in step S14. In the case of contention-based random access, the UE may transmit an additional PRACH in step S15, and receive a PDCCH and a PDSCH corresponding to the PDCCH in step S16 in such a manner that the UE can perform a contention resolution procedure.

After the above random access procedure, the UE may receive a PDCCH/PDSCH (S17) and transmit a Physical Uplink Shared CHannel (PUSCH)/Physical Uplink Control CHannel (PUCCH) (S18) in a general uplink/downlink signal transmission procedure.

Control information that the UE transmits to the BS is referred to as uplink control information (UCI). The UCI includes a Hybrid Automatic Repeat and reQuest ACKnowledgment/Negative-ACK (HARQ ACK/NACK) signal, a Scheduling Request (SR), Channel Quality Indictor (CQI), a Precoding Matrix Index (PMI), and a Rank Indicator (RI).

In the LTE system, UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Figure 2:
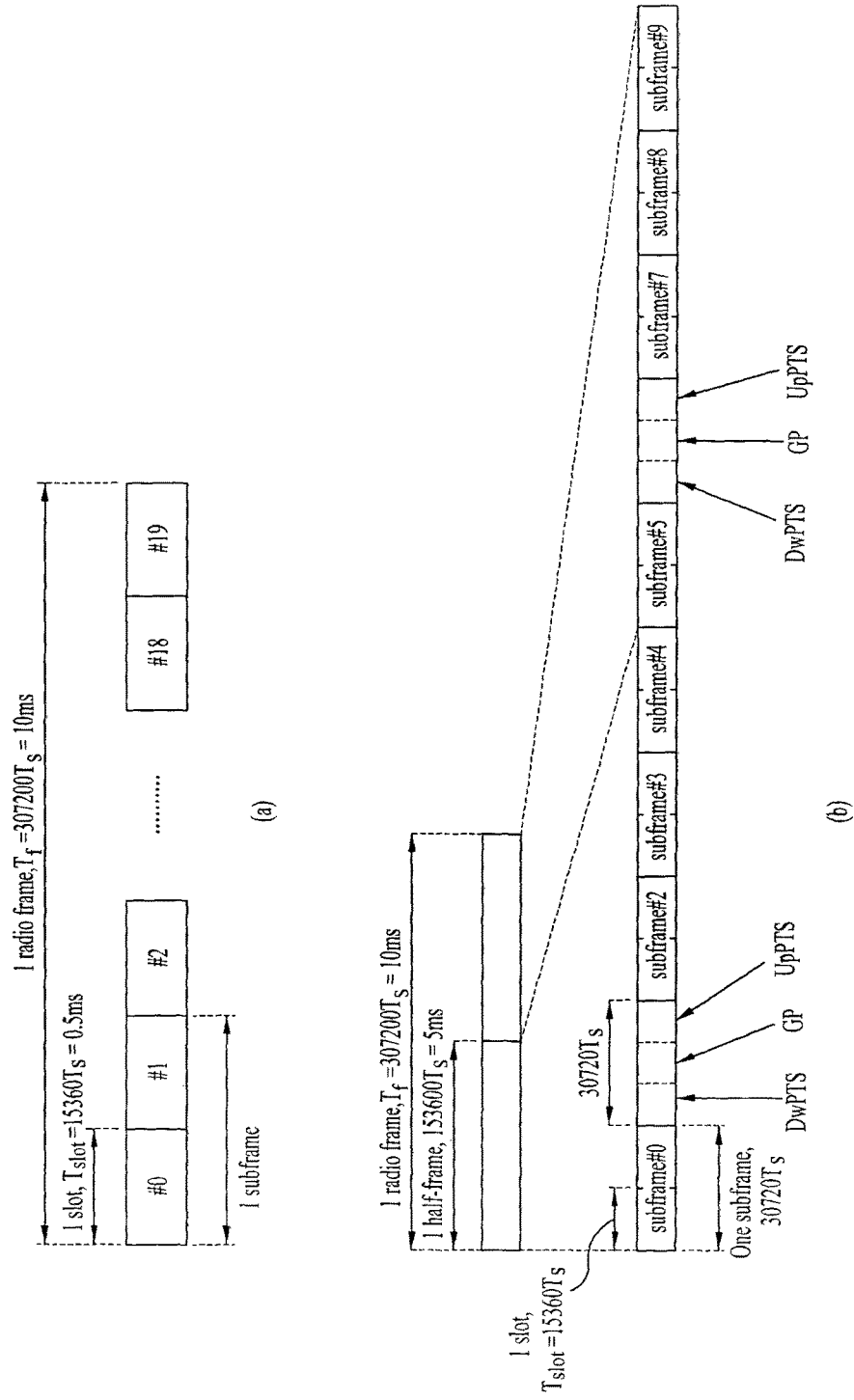
FIG. 2 is a diagram illustrating a structure of a radio frame for use in a 3GPP LTE system.

FIG. 2 is a diagram illustrating a structure of a radio frame for use in a 3GPP LTE system.

FIG. 2(a) illustrates a frame structure type 1. The Type-1 frame structure shown in FIG. 2(a) may be applied to a Frequency Division Duplexing (FDD) system and a half-FDD (H-FDD) system.

Referring to FIG. 2(a), one radio frame has a length of 10 ms ($T_f$=327200·$T_s$=10 ms). The single radio frame is divided into 20 equally-sized slots, each of which is 0.5 ms long ($T_{slot}$=15360·$T_s$=0.5 ms). The 20 slots may be sequentially numbered from 0 to 19. One subframe includes two contiguous slots. An i-th subframe includes a slot (2i) and a slot (2i+1). That is, the radio frame includes subframes. A time required for transmitting one subframe is defined as a Transmission Time Interval (TTI). Here, $T_s$ denotes a sampling time, and is expressed by '$T_s$=1/(15 kHz×2048) =3.2552×10$^{-8}$ (about 33 ns)'. The slot includes a plurality of OFDM symbols in a time domain, and includes a plurality of resource blocks (RBs) in a frequency domain.

One slot includes a plurality of OFDM symbols in the time domain. Since 3GPP LTE uses OFDMA in downlink, the OFDM symbol is used to indicate one symbol period. The OFDM symbol may be referred to as one SC-FDMA symbol or one symbol period. The resource block is a resource allocation unit, and includes a plurality of contiguous subcarriers in one slot.

During each period of 10 ms for use in the full-duplex FDD system, 10 subframes can be simultaneously used for UL and DL transmission. In this case, the UL transmission and the DL transmission are separated from each other in the frequency domain. In contrast, a user equipment (UE) for use in the half-duplex FDD system is unable to simultaneously perform transmission and reception operations.

The above-mentioned radio frame structure is only exemplary. Accordingly, the number of subframes included in the radio frame, the number of slots included in the subframe or the number of symbols included in the slot may be changed in various manners.

FIG. 2(b) illustrates a frame structure type 2. The frame structure type 2 is applied to a TDD system. One radio frame has a length of 10 ms ($T_f$=327200·$T_s$=10 ms), and is composed of two half-frames each having a length of 5 ms (153600·$T_s$=5 ms). Each half-frame includes 5 subframes each having a length of 1 ms (32720·$T_s$=1 ms). The i-th subframe includes two slots (2i, 2i+1) each having a length of 0.5 ms ($T_{slot}$=15360·$T_s$=0.5 ms). Here, $T_s$ denotes a sampling time, and is expressed by '$T_s$=1/(15 kHz× 2048)=3.2552×10$^{-8}$ (about 33 ns)'.

The frame structure type 2 includes a special subframe composed of three fields, i.e., a downlink pilot time slot (DwPTS), a guard period (GP), and an uplink pilot time slot (UpPTS). In this case, DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal.

Table 1 shows configuration of the special frame. That is, Table 1 shows DwPTS/GP/UpPTS lengths.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

In the frame structure type 2, the UL-DL configuration indicates how all the subframes are allocated (or reserved) to DL and UL. Table 2 shows UL-DL configuration.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, D denotes a subframe for DL transmission, U denotes a subframe for UL transmission, and S denotes a special subframe composed of three fields (i.e., DwPTS, GP, UpPTS). The UL-DL configuration can be classified into 7 UL-DL configurations. The positions and numbers of DL subframes, special subframes, and UL subframes are different from each other per UL-DL configuration.

A time at which DL is changed to UL or a time at which UL is changed to DL is referred to as a switching point. Switch-point periodicity denotes a period in which switching between a UL subframe and a DL subframe is equally repeated. The switch-point periodicity supports each of 5 ms and 10 ms. In case of the 5 ms DL-UL switch-point period, a special subframe (S) is present per half-frame. In case of 5 ms DL-UL switch-point period, the special subframe (S) is present only in a first half-frame.

In all the configurations, each of the $0^{th}$ subframe, the $5^{th}$ subframe, and DwPTS are used for DL transmission only. UpPTS and a subframe immediately subsequent to the special subframe (S) are always used for UL transmission.

The above-mentioned UL-DL configuration is considered to be system information well known to all of the BS and the UE. The BS is configured to transmit only an index of configuration information whenever the UL-DL configuration information is changed, so that the change of a UL-DL allocation state of a radio frame can be recognized by the UE. In addition, configuration information is a kind of DL control information, and can be transmitted through a Physical Downlink Control Channel (PDCCH) serving as a DL control channel in the same manner as in other scheduling information. The configuration information serving as broadcast information can be commonly transmitted to all UEs contained in the cell through a broadcast channel. In the TDD system, the number of half frames contained in a radio frame, the number of subframes contained in a half frame, and a combination of DL and UL subframes is disclosed only for illustrative purposes.

Meanwhile, HARQ ACK/NACK transmitted to the UE over a PHICH at an i-th subframe in the FDD system is associated with a PUSCH transmitted at an (i−4)-th subframe by the UE.

On the other hand, a DL/UL subframe configuration of the TDD system is different per a UL-DL configuration, so that a PUSCH and PHICH transmission time is different per configuration and the PUSCH and PHICH transmission time may be differently constructed according to an index (or number) of a subframe.

In the LTE system, UL/DL timing relationship among a PUSCH, a PDCCH preceding the PUSCH, and a PHICH for transmission of DL HARQ ACK/NACK corresponding to the PUSCH is predetermined.

Figure 3:
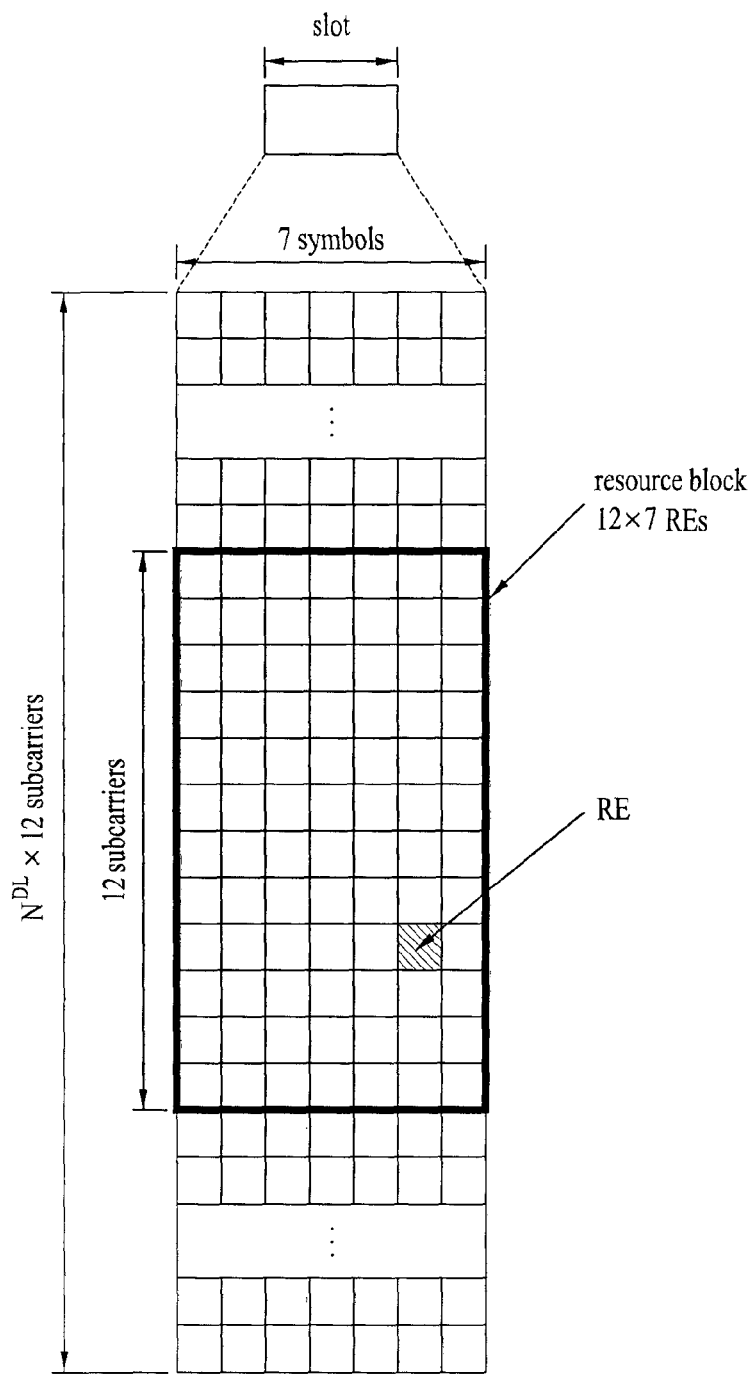
FIG. 3 exemplarily shows a resource grid of a single downlink slot.

FIG. 3 exemplarily shows a resource grid of a single downlink slot.

Referring to FIG. 3, one downlink slot includes a plurality of OFDM symbols in a time domain. Although one downlink slot includes 7 OFDM symbols and one resource block (RB) includes 12 subcarriers in a frequency domain, the scope or spirit of the present invention is not limited thereto.

Each element on a resource grid may be defined as a resource element (RE). One RB includes 12×7 REs. The number ($N^{DL}$) of RBs contained in a downlink slot is dependent upon a downlink transmission bandwidth. An uplink slot structure is identical to the downlink slot structure.

Figure 4:
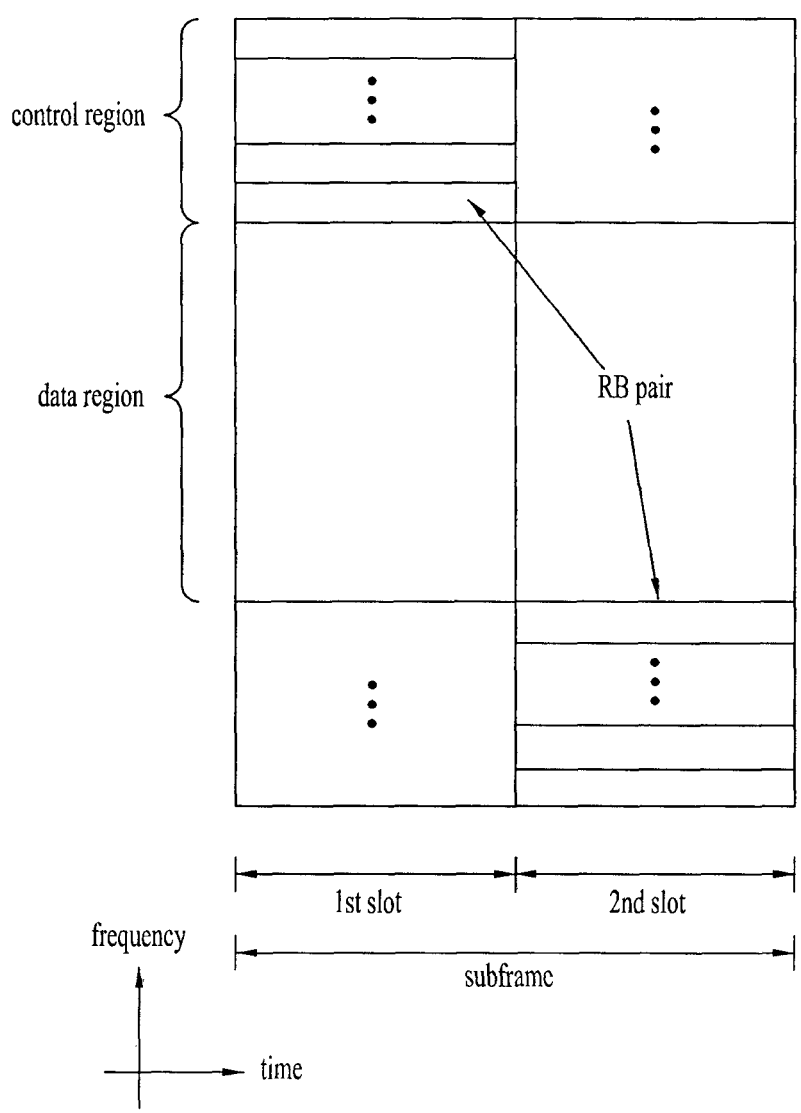
FIG. 4 illustrates an uplink subframe structure.

FIG. 4 illustrates an uplink subframe structure.

Referring to FIG. 4, a UL subframe is divided into a control region and a data region in the frequency domain.

PUCCH carrying UL control information is allocated to the control region. PUSCH carrying user data is allocated to the data region. In order to maintain a single carrier property, one UE does not simultaneously transmit a PUCCH signal and a PUSCH signal. A PUCCH for one UE is allocated in an RB pair in a subframe and RBs belonging to the RB pair occupy different subcarriers in each of two slots. Thus, the RB pair allocated to the PUCCH is 'frequency-hopped' at a slot boundary.

Figure 5:
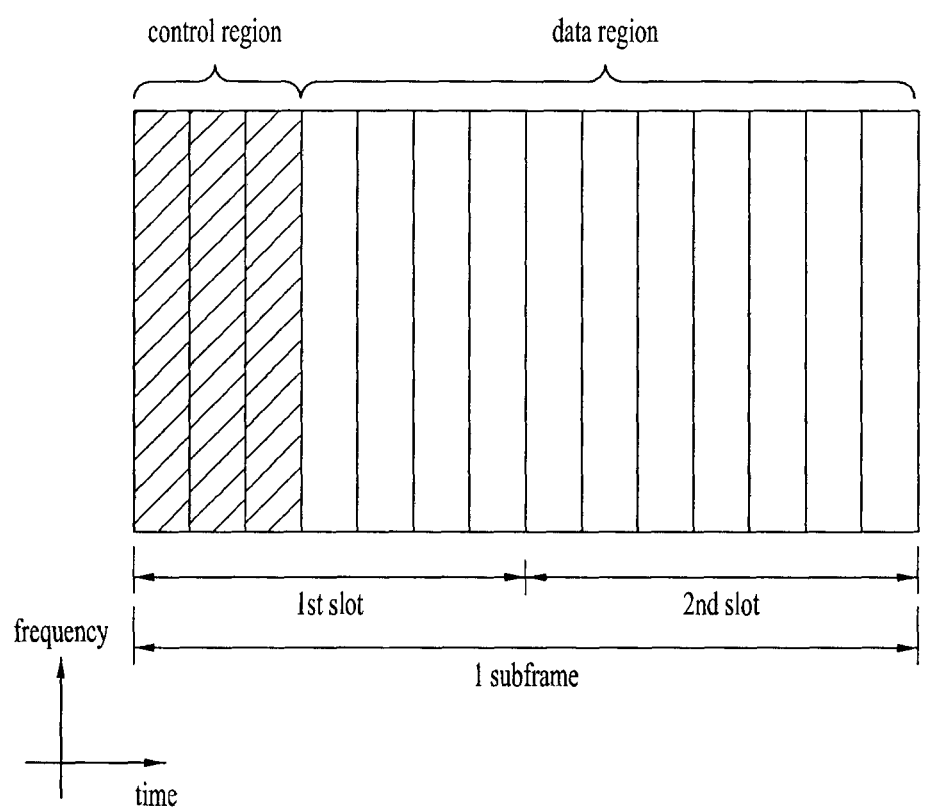
FIG. 5 illustrates a downlink frame structure.

FIG. 5 illustrates a downlink frame structure.

Referring to FIG. 5, a maximum of three OFDM symbols located in the front of a first slot of the subframe are used as a control region to which control channels are allocated, and the remaining OFDM symbols are used as a data region to which a Physical Downlink Shared Channel (PDSCH) channel is allocated. DL control channels for use in the 3GPP LTE system include a Physical Control Format Indicator CHannel (PCFICH), a Physical Downlink Control Channel (PDCCH), a Physical Hybrid-ARQ Indicator CHannel (PHICH), and the like.

PCFICH transmitted through a first OFDM symbol of the subframe may carry information about the number of OFDM symbols (i.e., size of the control region) used for transmission of control channels within the subframe. PHICH serving as a response channel to an uplink may carry ACK (Acknowledgement)/NACK (Non-Acknowledgement) signals about a Hybrid Automatic Repeat Request (HARQ). Control information transmitted over a PDCCH is referred to as Downlink Control Information (DCI). For example, DCI includes uplink resource allocation information (UL grant), downlink resource allocation information (DL grant), or an uplink transmission (UL Tx) power control command for an arbitrary UE group, etc.

1.2. Physical Downlink Control Channel (PDCCH)

1.2.1. Overview of PDCCH

PDCCH may carry information about resource allocation and transmission format (DL grant) of a downlink shared channel (DL-SCH), resource allocation information (UL grant) of an uplink shared channel (UL-SCH), paging information of a paging channel (PCH), resource allocation information about an upper layer control message such as a random access response transmitted over a PDSCH, a set of transmission power control commands for each UE contained in an arbitrary UE group, and information about Voice over Internet Protocol (VoIP) activation, etc.

A plurality of PDCCHs may be transmitted within the control region, and the UE may monitor the PDCCHs. Each PFCCH includes an aggregate of one or more contiguous control channel elements (CCEs). The PDCCH composed of the aggregate of one or more contiguous CCEs may be transmitted through the control region after performing subblock interleaving. CCE is a logical allocation unit for providing a coding rate based on a Radio frequency (RF) channel status to the PDCCH. CCE may correspond to a plurality of resource element groups. PDCCH format and the number of available PDCCHs may be determined according to the relationship between the number of CCEs and the coding rate provided by CCEs.

1.2.2. PDCCH Structure

A plurality of multiplexed PDCCHs for a plurality of UEs can be transmitted within a control region: PDCCH may be composed of one or more contiguous CCE aggregations. CCE is a predetermined unit corresponding to 9 sets of an REG composed of 4 resource elements (REs). 4 QPSK (Quadrature Phase Shift Keying) symbols are mapped to each REG. Resource elements (REs) occupied by a reference signal (RS) are not contained in the REG. That is, a total number of REGs contained in an OFDM symbol may be changed according to the presence or absence of a cell-specific reference signal (RS). Concept of an REG configured to map 4 resource elements (REs) to one group can also be applied to another DL control channel (e.g., PDFICH or PHICH). Provided that an REG not allocated to PCFICH or PHICH is denoted by $N_{REG}$, the number of CCEs available to the system is denoted by $N_{CCE} = \lfloor N_{REG}/9 \rfloor$, and individual CCEs are indexed from 0 to $N_{CCE}-1$.

In order to simplify a decoding process of the UE, a PDCCH format including n CCEs may start from a specific CCE having the same index as a multiple of n. That is, if the CCE index is denoted by i, the PDCCH format may start from a CCE configured to satisfy i mod n=0.

The base station (BS) may use {1, 2, 4, 8} CCEs to configure one PDCCH signal. Here, {1, 2, 4, 8} are referred to as CCE aggregation levels. The number of CCEs used to transmit a specific PDCCH is determined by the BS according to a channel state. For example, a PDCCH for a UE having a good DL channel state (where the UE may be located close to the BS) can be sufficiently covered by only one CCE. In contrast, if a UE having a poor channel state (where the UE may be located at a cell edge), 8 CCEs may be needed for sufficient robustness. In addition, a PDCCH power level may be mapped to a channel state, and then adjusted according to the channel state.

Table 3 shows a PDCCH format, and four PDCCH formats are supported according to CCE aggregation levels.

TABLE 3

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The reason why a different CCE aggregation level is assigned to each UE is that a format or MCS (Modulation and Coding Scheme) of PDCCH control information is differently assigned to each UE. MCS level denotes a code rate and a modulation order for use in the data coding. Adaptive MCS level is used for link adaptation. Generally, a control channel for transmitting control information may consider about 3 or 4 MCS levels.

Control information transmitted over a PDCCH is referred to as downlink control information (DCI). Configuration of information loaded on a PDCCH payload may be changed according to a DCI format. PDCCH payload denotes information bits. Table 4 shows DCI according to DCI format.

TABLE 4

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |

TABLE 4-continued

| DCI Format | Description |
|---|---|
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to Table 4, DCI formats include format 0 for PUSCH scheduling, format 1 for scheduling of one PDSCH codeword, format 1A for compact scheduling of one PDSCH codeword, format 1C for compact scheduling of DL-SCH, format 2 for PDSCH scheduling in a closed-loop spatial multiplexing mode, format 2A for PDSCH scheduling in an open loop spatial multiplexing mode, and formats 3 and 3A for transmission of transmission power control (TPC) commands for uplink channels. DCI format 1A can be used for PDSCH scheduling irrespective of the transmission mode of a UE.

The length of PDCCH payload may be changed according to DCI format. In addition, the type and length of PDCCH payload may be changed according to the presence or absence of compact scheduling or according to a transmission mode established in the UE.

The transmission mode may be configured for the UE to receive downlink data through a PDSCH. For example, downlink data through a PDSCH may include UE-scheduled data, paging, a random access response, or broadcast information through a BCCH. Downlink data through a PDSCH is associated with DCI format signaled through a PDCCH. The transmission mode may be semi-statically established in the UE through higher layer signaling (e.g., RRC (Radio Resource Control) signaling). The transmission mode can be classified into single antenna transmission or multi-antenna transmission. The UE can semi-statically establish a transmission mode through higher layer signaling. For example, the multi-antenna transmission may include transmit diversity, open-loop or closed-loop spatial multiplexing, MU-MIMO (Multi-User Multiple Input Multiple Output) or beamforming, etc. The transmit diversity can increase transmission reliability by transmitting the same data through multiple transmission antennas. The spatial multiplexing enables multiple transmission antennas to simultaneously transmit different data so that it can transmit high-speed data without increasing a system bandwidth. Beamforming can increase a Signal to Interference plus Noise Ratio (SINR) on the basis of a weight varying with a channel status using multiple antennas.

DCI format is dependent upon a. UE-configured transmission mode. In case of a reference DCI format, the UE can monitor necessary information according to the UE-configured transmission mode. The UE-configured transmission mode may be classified into the following seven transmission modes (1) to (7).

1) Single antenna port: Port 0
2) Transmit Diversity
3) Open-loop Spatial Multiplexing
4) Closed-loop Spatial Multiplexing
5) MU-MIMO
6) Closed-loop rank=1 precoding
7) Single antenna port: Port 5

1.2.3. PDCCH Transmission

A base station (BS) decides a PDCCH format according to DCI to be sent to the UE, and adds a Cyclic Redundancy Check (CRC) to control information. The CRC is masked with an identifier (e.g., a Radio Network Temporary Identifier (RNTI)) according to a PDCCH owner or a purpose of the PDCCH. For example, provided that the PDCCH is provided for a specific UE, an identifier of the corresponding UE (e.g., cell-RNTI (C-RNTI)) may be masked with the CRC. If PDCCH is provided for a paging message, a paging identifier (e.g., paging-RNTI (P-RNTI)) may be masked with a CRC. If a PDCCH is provided for system information (e.g., system information block (SIB)), system information RNTI (SI-RNTI) may be masked with CRC. In order to indicate a random access response to transmission of a UE random access preamble, random access-RNTI (RA-RNTI) may be masked with CRC.

The BS generates coded data by performing channel coding on CRC-added control information. In this case, the BS can perform channel coding at a code rate depending on the MCS level. The BS performs rate matching according to a CCE aggregation level allocated to a PDCCH format. Thereafter, the BS modulates the coded data and thus generates modulation symbols. In this case, the BS may use a modulation sequence depending on the MCS level. The modulation symbols contained in one PDCCH may correspond to one of CCE aggregation levels 1, 2, 4 and 8. Thereafter, the BS maps the modulation symbols to a physical resource element (PRE) (i.e., CCE to RE mapping).

1. 2. 4. Blind Decoding

A plurality of PDCCHs can be transmitted within one subframe. That is, a control region of one subframe is composed of a plurality of CCEs having indices $0 \sim N_{CCE,k}-1$. In this case, $N_{CCE,k}$ is a total number of CCEs contained in a control region of the k-th subframe. The UE monitors a plurality of PDCCHs for each subframe. In this case, the term "monitoring" means that the UE attempts to decode each PDCCH according to a monitored PDCCH format. In the control region allocated to the subframe, the BS does not provide the UE with the corresponding PDCCH position information. In order to receive a control channel transmitted from the BS, the UE is unable to recognize where its own PDCCH is transmitted at a certain CCE aggregation level or a DCI format, so that the UE searches for the PDCCH by monitoring an aggregate of PDCCH candidates within the subframe. The above-mentioned operation is referred to as Blind Decoding/Detection (BD). The blind decoding (BD) means that a UE ID is demasked with a CRC and investigates CRC errors, so that it can allow the UE to recognize whether the corresponding PDCCH is a control channel of the UE. In the active mode, the UE monitors a PDCCH of each subframe so as to receive data to be sent to the UE. In the DRX mode, the UE is awakened from the monitoring section of each DRX period, and monitors a PDCCH in the subframe corresponding to the monitoring section. The subframe in which PDCCH monitoring is performed is referred to as a non-DRX subframe.

The UE must perform blind decoding (BD) of all CCEs contained in the control region of the non-DRX subframe so as to receive a PDCCH to be sent to the UE. Since the UE does not recognize which PDCCH format will be transmitted, it must decode all PDCCHs at all available CCE aggregation levels until PDCCH blind decoding (BD) is successfully performed in each non-DRX subframe. The LTE system has defined a Search Space (SS) concept to perform UE blind decoding. The SS means a set of PDCCH candidates for monitoring. The SS may have a different size according to each PDCCH format. The SS may be comprised of a Common Search Space (CSS) and a UE-specific/Dedicated Search Space (USS). In case of the CSS, all UEs can recognize the size of CSS, but the USS may be independently established for each UE. Therefore, the UE must monitor the USS and the CSS to decode a PDCCH, so that the UE performs blind decoding (BD) a maximum of 44 times within one subframe. In this case, blind decoding (BD) to be performed according to different CRC values (for example, C-RNTI, P-RNTI, SI-RNTI, RA-RNTI) is not performed.

Due to a small-sized search space, the BS may not acquire CCE resources used for transmitting a PDCCH to all UEs configured to transmit the PDCCH within a given subframe, because the remaining resources generated after the CCE position has been allocated may not be contained in a search space (SS) of a specific UE. In order to minimize such barrier capable of being continued even in the next subframe, a UE specific hopping sequence may be applied to a start point of the UE-specific SS.

Table 5 shows the sizes of common search space (CSS) and UE-specific search space (USS).

TABLE 5

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to reduce UE calculation load dependent upon the number of blind decoding (BD) attempt times, the UE does not simultaneously perform search actions for all the defined DCI formats. In more detail, the UE always searches for DCI format 0 and DCI format 1A in the UE-specific SS. In this case, although DCI format 0 and DCI format LA have the same size, the UE can discriminate a DCI format using a "flag for format 0/format 1A differentiation" contained in a PDCCH. In addition, other DCI formats may be requested except for DCI formats 0 and 1A. For example, DCI format 1, DCI format 1B, and DCI format 2 may be used.

In the common search space (CSS), the UE can search for DCI format 1A and DCI format 1C. In addition, the UE may be configured to search for DCI format 3 or 3A. Although DCI formats 3 and 3A may have the same size as DCI formats 0 and 1A, the UE can discriminate a DCI format using a CRC scrambled by another ID instead of a UE-specific ID.

The search space $S_k^{(L)}$ means a PDCCH candidate set according to an aggregation level $L \in \{1, 2, 4, 8\}$. CCE dependent upon a PDCCH candidate set m of the search space can be determined by the following equation 1.

$$L \cdot \{(Y_k+m) \bmod \lfloor N_{CCE,k}/L \rfloor\}+i \qquad \text{[Equation 1]}$$

In Equation 1, $M^{(L)}$ is the number of PDCCH candidates according to a CCE aggregation level L required for the monitoring action in the search space, where m is denoted by m=0, ..., $M^{(L)}$−1. i is an index for designating each CCE at each PDCCH candidate a PDCCH, as represented by i=0, ..., L−1. In Equation 1, k is denoted by k=$\lfloor n_s/2 \rfloor$, $n_s$ is a slot index within a radio frame.

As described above, the UE monitors both a UE-specific search space (USS) and a common search space (CSS) to decode a PDCCH. Here, the CSS supports PDCCHs having aggregation levels {4, 8}, and the USS supports PDCCHs having aggregation levels {1, 2, 4, 8}. Table 6 shows PDCCH candidates monitored by the UE.

TABLE 6

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 1, in case of the CSS, $Y_k$ for two aggregation levels L=4 and L=8 is set to zero '0'. In contrast, in case of the USS, $Y_k$ for the aggregation level L is denoted by the following equation 2.

$$Y_k=(A \cdot Y_{k-1}) \bmod D \qquad \text{[Equation 2]}$$

In Equation 2, $Y_{k-1}$ is denoted by $Y_{k-1}=n_{RNTI} \neq 0$, $n_{RNTI}$ is an RNTI value, A is set to 39827 (A=39827), and D is set to 65537 (D=65537).

2. Carrier Aggregation (CA) Environment 2.1. General Carrier Aggregation (CA)

Environments that are taken into consideration in the embodiments of the present invention include all general multicarrier resource environments. That is, the term "multicarrier system" or "carrier aggregation system" used in the present invention refers to a system that uses an aggregation of one or more carriers having a smaller bandwidth than a target bandwidth when configuring a target wideband in order to support wideband.

In the present invention, the term "multicarrier" or "multiple carriers" refers to a carrier aggregation (or carrier linkage or combination). Here, the term "carrier aggregation" refers not only to an aggregate of contiguous carriers but also to an aggregate of non-contiguous carriers. Different numbers of component carriers may be aggregated for the downlink and the uplink. Aggregation of the same number of DL CCs and UL CCs is referred to as symmetric aggregation, whereas aggregation of different numbers of DL CCs and UL CCs is referred to as asymmetric aggregation. The term "carrier aggregation" may be used interchangeably with the terms "bandwidth aggregation" and "spectrum aggregation".

Carrier aggregation (CA) that is constructed by combining two or more component carriers (CCs) aims to support a bandwidth of up to 100 MHz in the LTE-A system, When one or more carriers having a smaller bandwidth than the target bandwidth are combined (or aggregated), bandwidths of the carriers to be combined may be limited to bandwidths that are used in the conventional IMT system in order to maintain backward compatibility with the conventional IMT system. For example, the conventional 3GPP LTE system supports bandwidths of 1.4, 3, 5, 10, 15, and 20 MHz and the LTE-advanced (LTE_A) system can support a greater bandwidth than 20 MHz using only the bandwidths supported by the LTE system. In addition, the carrier aggregation (CA) system used in the present invention can also define a new bandwidth, regardless of the bandwidths used in the conventional system, to support carrier combination (i.e., carrier aggregation).

The LTE-A system uses the concept of a cell so as to manage radio resources. The above-mentioned carrier aggregation (CA) environment may be referred to as a "multi-cell environment". The cell is defined as a combination of a DL resource and a UL resource. Here, the UL resources are not an essential part. Accordingly, the cell can be configured using DL resources only, or DL resources and UL resources. Provided that a specific UE has only one configured serving cell, the UE may use one DL CC and one UL CC. However, if the specific UE has two or more configured serving cells, it may have as many DL CCs as the number of cells and as many UL CCs as the number of DL CCs or less. Alternatively, the specific UE may also have as many UL CCs as the number of cells and as many DL CCs as the number of UL CCs or less. That is, if the specific UE has a plurality of configured serving cells, it is possible to support the carrier aggregation (CA) environment in which the number of DL CCs is less than the number of UL CCs. That is, the carrier aggregation (CA) may be understood as an aggregate of two or more cells having different carrier frequencies (i.e., different intermediate frequencies of the cell). In this case, the term "cell" must be distinguished from "cell" serving as a specific region covered by a general BS.

The cell for use in the LTE-A system includes a primary cell (PCell) and a secondary cell (SCell). Each of PCell and SCell may be used as a serving cell. For a UE that does not support carrier aggregation (CA) while in an RRC_connected state, only one serving cell configured with a PCell exists. Conversely, for a UE that is in an RRC_Connected state and supports carrier aggregation (CA), one or more serving cells including a PCell and at least one SCell are contained in the entire serving cell.

The serving cells (PCell and SCell) may be configured through RRC parameters. PhysCellId is an identifier (ID) for identifying a physical layer of the cell, and may be set to any one of integers from 0 to 503. SCellIndex is a short identifier (ID) used for identifying the SCell, and may be set to any one of integers from 1 to 7. ServCellIndex is a short ID for identifying the serving cell (PCell or SCell), and may be set to any one of integers from 0 to 7. The integer '0' is applied to PCell, and SCellIndex is preassigned to be applied to SCell. That is, a cell having the smallest cell ID (or the lowest cell index) from among ServCellIndex is used as a PCell.

PCell is a cell that operates on a primary frequency (or a primary CC). PCell may be used to perform initial connection configuration or connection reconfiguration, and may refer to a cell designated in a handover process. In addition, PCell refers to a cell used as a center of control-related communication from among the serving cells configured in the carrier aggregation (CA) environment. That is, the UE can receive and transmit a PDCCH within its own PCell. The UE may use only PCell when acquiring system information or changing the monitoring procedure. Evolved Universal Terrestrial Radio Access (E-UTRAN) may change only the PCell so as to perform handover of a UE supporting the CA environment using RRC connection reconfiguration (RRCConnectionReconfiguration) message of a higher layer including mobility control information (mobilityControlInfo).

SCell may refer to a cell operated in a secondary frequency (or a secondary CC). One PCell is allocated to a specific UE, and one or more SCells may be allocated to the specific UE. SCell may be configured after RRC connection has been achieved, and may also be used to provide additional radio resources. The remaining cells (i.e., SCell) other than PCell from among serving cells configured in the carrier aggregation (CA) environment have no PUCCH. When SCell is added to the UE supporting the CA environment, E-UTRAN can provide all system information related to the cell staying in an RRC_CONNECTED state through a specific dedicated signal. The change of system information may be controlled by release or addition of the related SCell. In this case, an RRC connection reconfiguration (RRCConnectionReconfiguration) message of the higher layer may be used. E-UTRAN can perform dedicated signaling having a different parameter for each UE without broadcasting information within the related SCell.

After an initial security activation procedure is started, an E-UTRAN may configure a network including one or more SCells in addition to an initially configured PCell during a connection configuration procedure. In a multicarrier environment, each of a PCell and an SCell may serve as a CC. In the following embodiments, a Primary CC (PCC) may have the same meaning as a PCell and a Secondary CC (SCC) may have the same meaning as an SCell.

Figure 6:
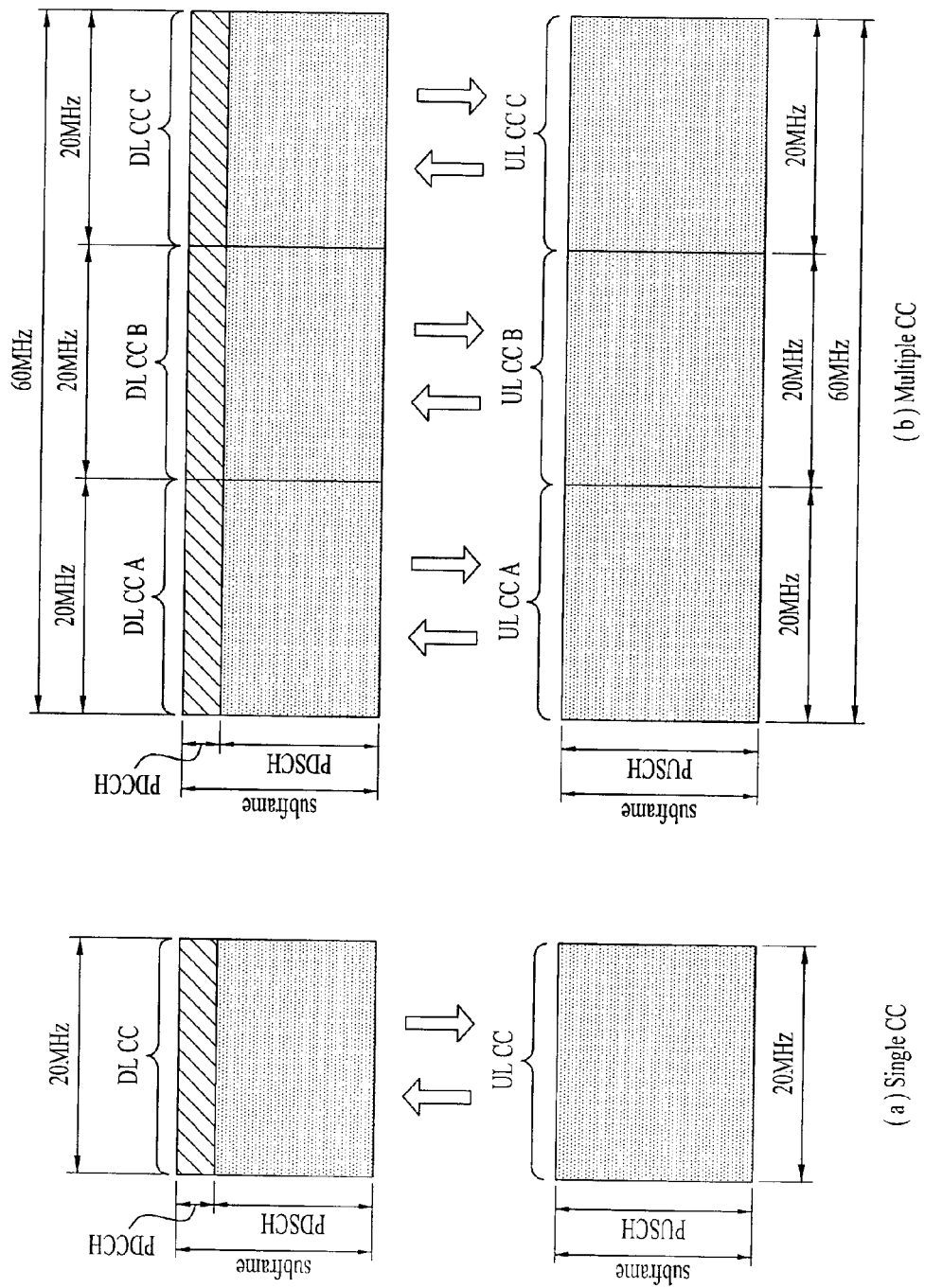
FIG. 6 exemplarily shows a component carrier (CC) for use in an LTE system and carrier aggregation (CA) for use in an LTE A system.

FIG. 6 exemplarily shows a component carrier (CC) for use in an LTE system and carrier aggregation (CA) for use in an LTE_A system.

FIG. 6(a) shows a single carrier structure for use in the LTE system. CCs can be classified into DL CC and UL CC. One CC may have a frequency range of 20 MHz.

FIG. 6(b) shows a carrier aggregation (CA) structure for use in the LTE_A system. FIG. 6(b) shows an exemplary case in which 3 CCs each having the frequency size of 20 MHz are combined. Although three DL CCs and three UL CCs exist, it should be noted that the number of DL CCs and the number of UL CCs are not limited thereto. In case of carrier aggregation (CA), the UE can simultaneously monitor three CCs, can receive DL signal and DL data, and can transmit UL signal and UL data.

If N DL CCs are managed in a specific cell, the network can allocate M DL CCs (where M≤N) to the UE. In this case, the UE monitors only M limited DL CCs and then receives DL signals. In addition, the network has priority over L DL CCs (where L≤M≤N) so that a main DL CC can be allocated to the UE. In this case, the UE must monitor L DL CCs. The above-mentioned scheme can also be applied to UL transmission.

Linkage between a carrier frequency (or DL CC) of DL resources and a carrier frequency (or UL CC) of UL resources may be indicated by either a higher-layer message (such as an RRC message) or system information. For example, a combination of a DL resource and a UL resource can be configured by linkage defined by System Information Block Type2 (SIB2). In more detail, linkage may indicate the mapping relationship between a DL CC and a UL CC. The DL CC is used for transmission of a PDCCH carrying the UL grant, and the UL CC is used for the UL grant. In addition, the linkage may indicate the mapping relationship between a DL CC (or UL CC) for transmission of HARQ data and a UL CC (or DL CC) for transmission of HARQ ACK/NACK signal.

2.2. Cross Carrier Scheduling

From the viewpoint of scheduling in a carrier (or carrier) or a serving cell for use in the carrier aggregation (CA) system, two scheduling methods, i.e., a self-scheduling method and a cross carrier Scheduling method, may be used. The cross carrier scheduling may be referred to as cross component carrier scheduling or cross cell scheduling.

In case of the self-scheduling, PDCCH (DL grant) or PDSCH may be transmitted to the same DL CC, or PUSCH that is transmitted according to a PDCCH (UL grant) transmitted at DL CC is transmitted through a UL CC linked to a DL CC having received the UL grant.

In case of the cross carrier scheduling, PDCCH (DL grant) and PDSCH are transmitted to different DL CCs, and a PUSCH that is transmitted according to a PDCCH (UL grant) transmitted at DL CC is transmitted through another UL CC but not a UL CC linked to a DL CC having received the UL grant.

Execution or non-execution of cross carrier scheduling may be UE-specifically activated or deactivated. Through higher layer signaling (e.g., RRC signaling), information about the activation or deactivation can be notified to each UE.

If cross carrier scheduling is activated, a carrier indicator field (CIF) is needed for a PDCCH. The CIF indicates which DL/UL CC is used for transmission of PDSCH/PUSCH indicated by the corresponding PDCCH. For example, PDCCH can allocate a PDSCH resource or a PUSCH resource to one of CCs using the CIF. That is, in the case where the PDSCH or PUSCH resource is allocated to one of DL/UL CCs in which a PDCCH on DL CC is aggregated in a multiplex manner, the CIF is configured. In this case, the DCI format of LTE-A Release-8 can be extended according to a CIF. In this case, the CIF may be fixed to a 3-bit field, or the location of the configured CIF may be fixed irrespective of the DCI format size. In addition, a PDCCH structure (i.e., resource mapping based on the same coding and the same CCE) of LTE-A Release-8 may be reused.

In contrast, in the case where a PDCCH on a DL CC allocates a PDSCH on the same DL CC or allocates a PUSCH resource on a single linked UL CC, no CIF is configured. In this case, the same PDCCH structure and DCI format (resource mapping based on the same coding and the same CCE) as those of LTE-A Release-8 may be used.

If it is possible to perform cross carrier scheduling, there is a need for the UE to monitor a PDCCH of multiple DCIs in the control region of the monitoring CC according to a per-CC transmission mode and/or per-CC bandwidth. Therefore, not only configuration of a search space capable of supporting the above-mentioned operation but also PDCCH monitoring is needed.

In the carrier aggregation (CA) system, a UE DL CC set may represent a set of DL CCs scheduled for the UE to receive a PDSCH, and a UE UL CC set may represent a set of UL CCs scheduled for the UE to transmit a PUSCH. In addition, the term "PDCCH monitoring set" indicates a set of one or more DL CCs configured to perform PDCCH monitoring. The PDCCH monitoring set may be identical to the UE DL CC set, or may be identical to a subset of UE DL CC sets. The PDCCH monitoring set may include at least one of DL CCs contained in the UE DL CC set. Alternatively, the PDCCH monitoring set may be separately defined irrespective of the UE DL CC set. DL CC contained in the PDCCH monitoring set may be configured in a manner that self-scheduling of the linked UL CC can always be executed. The UE DL CC set, the UE UL CC set, and the PDCCH monitoring set may be UE-specifically, UE group-specifically, or cell-specifically configured.

If cross carrier scheduling is deactivated, this means that the PDCCH monitoring set is always identical to the UE DL CC set. In this case, it is not necessary to perform indication such as separate signaling about the PDCCH monitoring set. However, if cross carrier scheduling is activated, it is preferable that the PDCCH monitoring set be defined in the UE DL CC set. In other words, in order to schedule a PDSCH or PUSCH for the UE, the base station (BS) transmits a PDCCH only through the PDCCH monitoring set.

Figure 7:
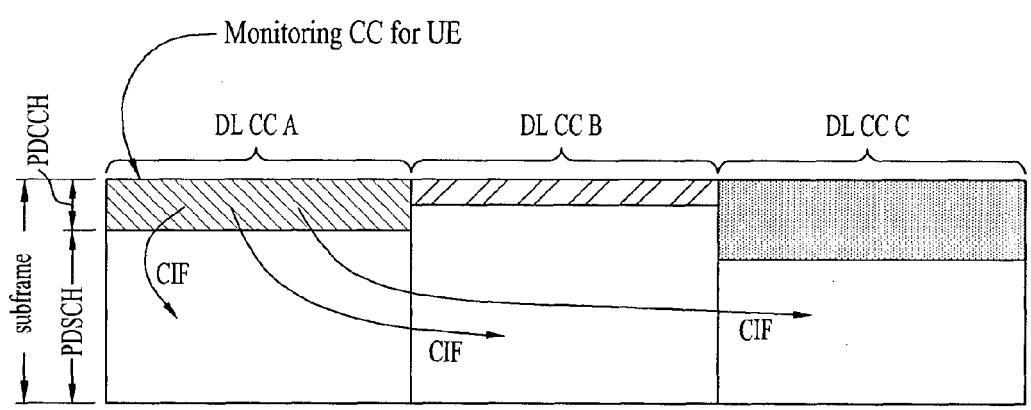
FIG. 7 shows a subframe structure of the LTE-A system according to cross-carrier scheduling.

FIG. 7 shows a subframe structure of the LTE-A system according to cross-carrier scheduling.

Referring to FIG. 7, a DL subframe for an LTE-A UE is combined with three DL CCs. DL CC 'A' indicates that a PDCCH monitoring DL CC is configured. If a CIF is not used, each DL CC can transmit a PDCCH configured to schedule its own PDSCH without using the CIF. In contrast, if the CIF is used through higher layer signaling, only one DL CC 'A' can transmit a PDCCH that is used for scheduling either PDSCH of the DL CC 'A' or a PDSCH of another CC. In this case, DL CC 'B' and DL CC 'C' not established as PDCCH monitoring DL CCs do not transmit a PDCCH.

3. Heterogeneous Network Structure

Figure 8:
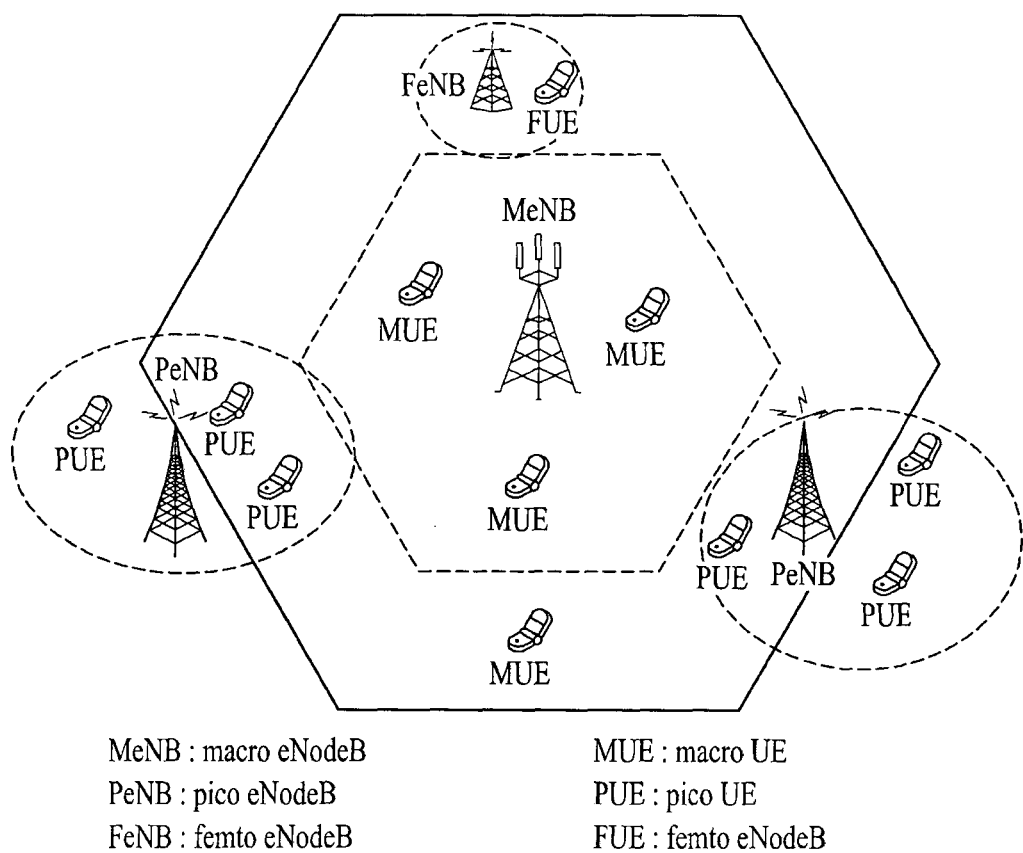
FIG. 8 is a diagram illustrating a heterogeneous network structure.
Figure 10:
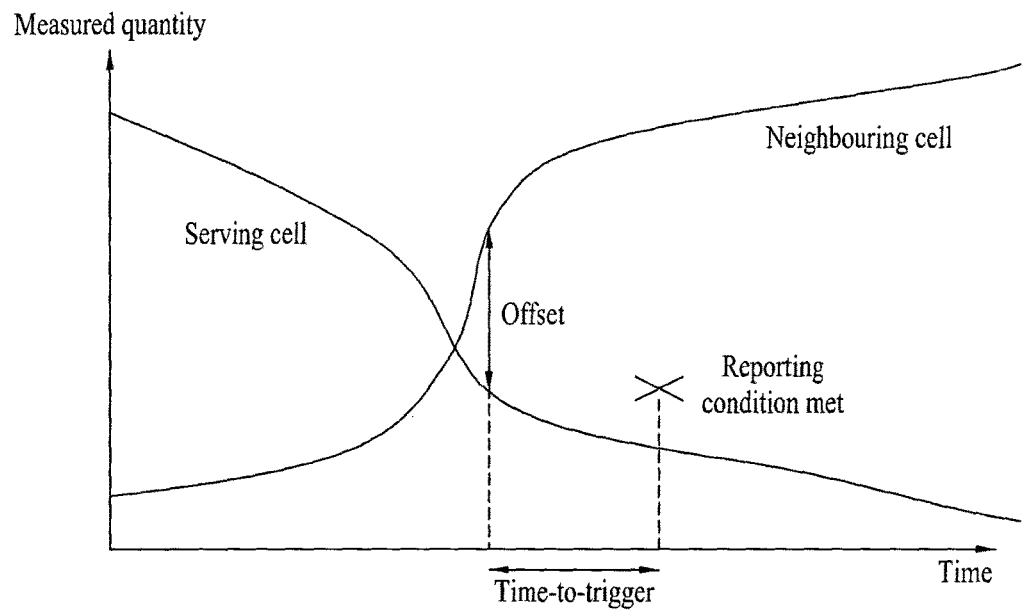
FIG. 10 exemplarily shows an event triggered reporting condition A3.

FIG. 8 is a diagram illustrating a heterogeneous network structure. Referring to FIG. 8, in order to more stably guarantee a data service such as a multimedia in the next-generation mobile communication, many developers and companies are conducting intensive research into either a hierarchical cell structure in which micro cells (i.e., a pico cell and/or a femto cell) for implementing low-power/short-distance communication are mixed in a macro-cell based homogeneous network, or a heterogeneous cell structure. Additional installation of a macro eNode-B is far from efficient in terms of costs and complexity needed for higher system performance. The heterogeneous network structure being considered in the current communication network may be configured and achieved as shown in FIG. 10.

4. General Handover Procedure

Figure 9:
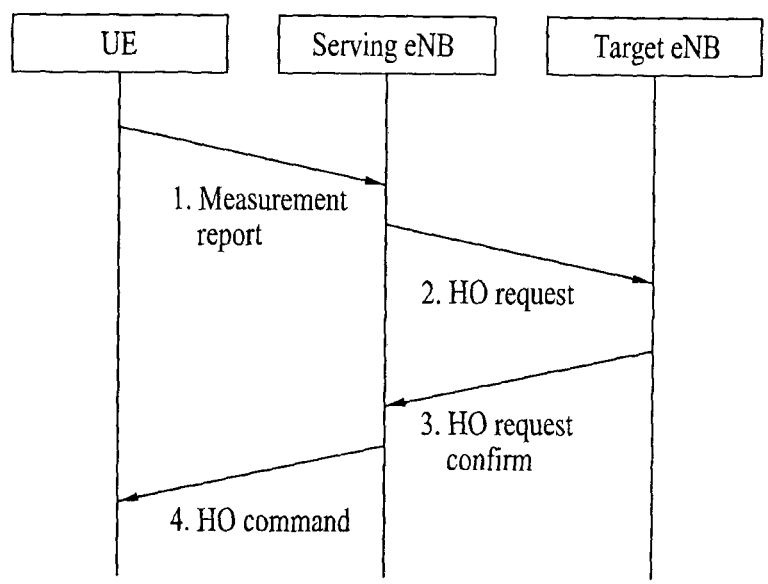
FIG. 9 is a flowchart illustrating a general handover procedure.

A basic handover procedure is classified into the following four steps (1) to (4) shown in FIG. 9.

(1) Measurement Reporting:

If a handover trigger occurs when a UE monitors a measurement value received from a serving cell or a neighbor cell, the UE reports the corresponding measurement value to a serving UE.

(2) Handover (HO) Request:

The corresponding serving eNB having received the handover measurement report from the UE transmits a handover (HO) request message to a target eNB for HO.

(3) Handover (HO) Request Confirmation:

The eNode B having received the HO request transmits a HO confirmation message to the corresponding eNode B.

(4) Handover (HO) Command:

The serving eNB having received the HO confirmation message transmits a HO command to the corresponding UE so that the UE can be handed over to the target eNB.

5. Measurement Reporting

In case of reporting configuration, the corresponding UE can report a measurement value to the corresponding eNB using the following event triggered reporting criteria.

(1) Event A1: A measurement value of the serving cell is better than an absolute threshold value.

(2) Event A2: A measurement value of the serving cell is worse than an absolute threshold value.

(3) Event A3: A measurement value is better than an offset related to a neighbor-cell serving cell.

(4) Event A4: A measurement value of the neighbor cell is better than an absolute threshold value.

(5) Event A5: A measurement value of the serving cell is worse than an absolute threshold value, and a measurement value of the neighbor cell is better than another absolute threshold value.

FIG. 10 exemplarily shows an event triggered reporting condition A3. That is, FIG. 10 shows the event triggered reporting condition corresponding to Event A3. Provided that an RSRP value from the serving cell is greater than an RSRP from a neighbor cell by a specific offset or more, if the corresponding condition is continuously satisfied after lapse of a constant time-to-trigger time, triggering is executed.

6. Cell Range Extension: CRE)

Figure 11:
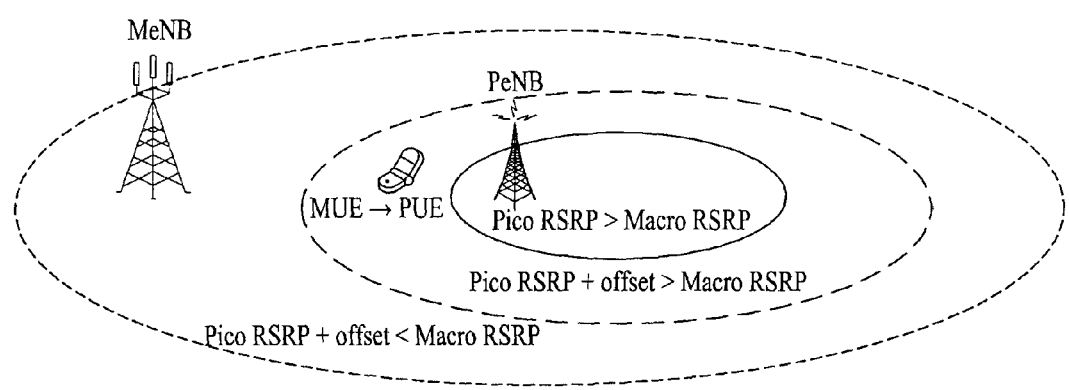
FIG. 11 exemplarily shows Cell Range Extension (CRE).

FIG. 11 exemplarily shows Cell Range Extension (CRE).

Cell Range Extension (CRE) indicates that UEs, that are located in the vicinity of a pico eNB (e.g., PeNB) and receive interference from the PeNB, from among MUEs connected to a macro eNB (e.g., MeNB) under the heterogeneous network environment are handed over to the PeNB. Influence of legacy interference can be reduced through such CRE execution, and load balancing can be achieved. If the serving cell is determined through single measurement comparison such as legacy RSRP, there is a high possibility that an RSRP value from the macro eNB (MeNB) having high transmission power is relatively higher than an RSRP from a PeNB having low power. Therefore, it is difficult for the corresponding MUE to be handed over to the corresponding PeNB. Therefore, CRE can be executed using the following criterion so as to implement smooth execution of the CRE technology.

$$\text{Pico RSRP+offset>Macro RSRP} \quad \text{[Equation 3]}$$

In Equation 3, an offset value is configured by higher layer signaling, and CRE to a PeNB having low transmission power can be executed.

Therefore, if each of a pico RSRP and an offset value is higher than a macro RSRP, CRE to a PeNB is executed.

7. Allocation of Almost Blank Subframe (ABS)

Heterogeneous network/deployments refers to a specific network structure in which micro cells for low-power/short-distance communication in a macro-cell based homogeneous network are mixed. The macro cell has larger coverage and higher transmission power, and refers to a general cell (or eNB) of a wireless communication system. The micro cell (or micro eNB) is a small-sized version of the macro cell, such that the micro cell may independently perform most of the functions of the macro cell. The micro cell may be installed (in an overlay manner) in an area covered by the macro cell or may be installed (in a non-overlay manner) in a shadow area that cannot be covered by the macro cell. The micro cell has a narrower coverage and lower transmission power and may accommodate a smaller number of user equipments (UEs), compared to the macro cell. The micro cell may be referred to as a pico cell, a femto cell, a Hom evolved Node B (HeNB), a relay, etc.

UE may be directly served by the macro cell or the micro cell. In some cases, the UE present within the coverage of the micro cell may be served by the macro cell.

The micro cell may be classified into two types according to access limitations of the UE. The first type is a Closed Subscriber Group (CSG) cell that prevents access of either a legacy macro UE (i.e., a UE served by the macro cell) or another micro UE (i.e., a UE served by the micro cell) without authentication. The second type is an Open Access Subscriber Group (OASC) or Open Subscriber Group (OSC) cell that allows access of the legacy macro UE or another micro UE.

Under the heterogeneous network environment in which the macro cell and the micro cell coexist, more serious inter-cell interference than the homogeneous network environment including only the macro cell (or the micro cell) may occur.

Figure 12:
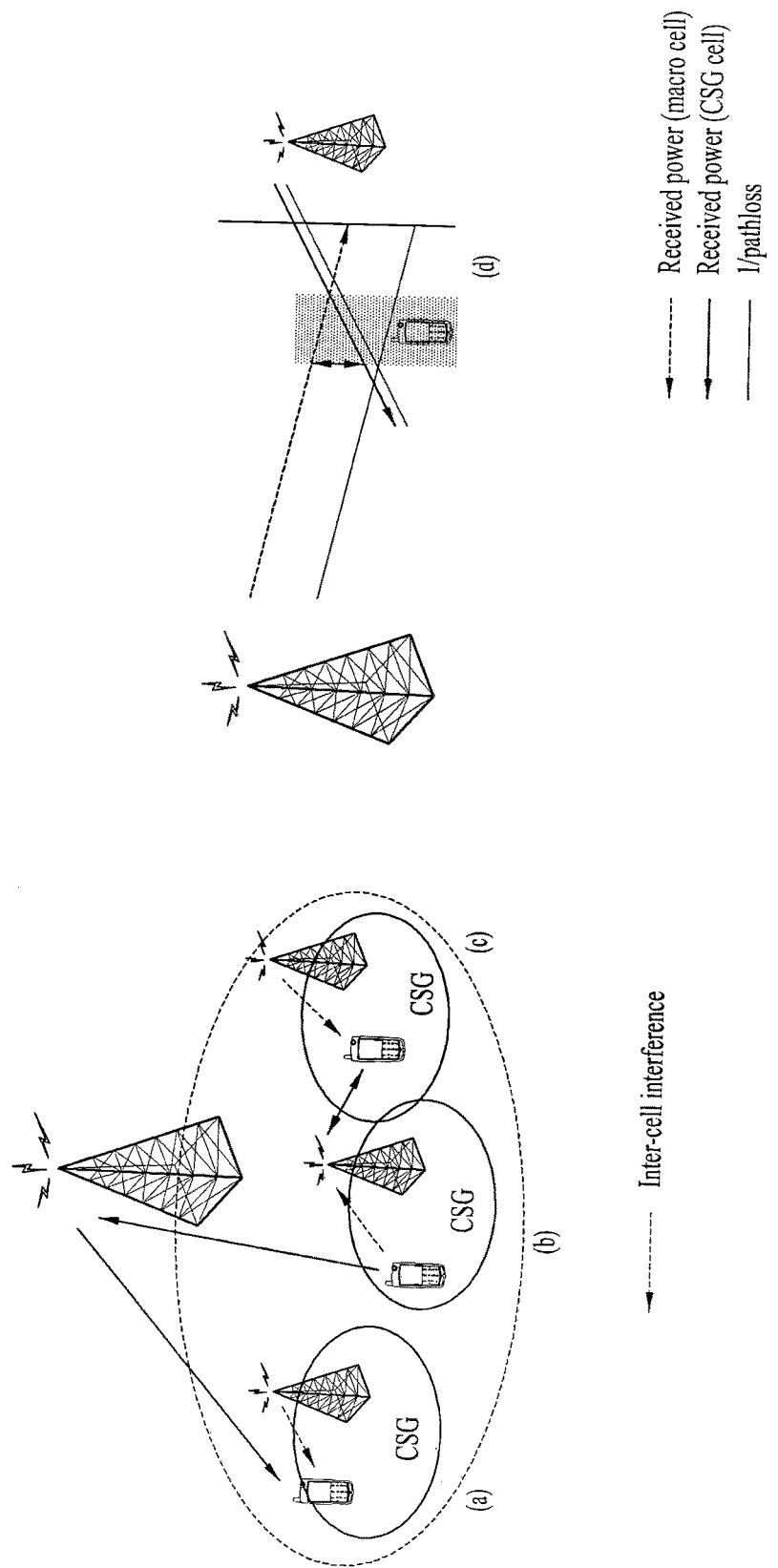
FIG. 12 exemplarily shows interference encountered between heterogeneous network wireless communication systems including a macro cell and a micro cell.

FIG. 12 exemplarily shows interference encountered between heterogeneous network wireless communication systems including a macro cell and a micro cell.

Referring to the case (a) of FIG. 12, the macro UE (MUE) in which access of the CSG cell is not permitted is interfered by HeNB. Referring to the case (b) of FIG. 12, the macro UE generates serious interference toward the HeNB. Referring to the case (c) of FIG. 12, the CSG UE is interfered by another CSG cell. Referring to the case (d) of FIG. 12, although uplink can be improved due to the use of cell-associated based passloss (e.g., a deviated Reference Signal Received Power (RSRP)), downlink interference of a UE but not the macro UE may increase.

The above-mentioned cases mean that not only UL and DL interference affecting data, but also L1 ($1^{st}$ layer)/L2 ($2^{nd}$ layer) control signaling and methods for handling a synchronization signal and a reference signal are of importance. The above-mentioned methods may operate in a time domain, a frequency domain, and/or a spatial region.

A macro-pico heterogeneous network and a macro cell may generate strong interference in a UE served by a pico cell (specially, a UE located at a boundary of the serving pico-cell). For time-domain Inter-Cell Interference Coordination (ICIC), the macro cell configured to generate interference provides a subframe called an ABS (or ABSF: Almost Blank Subframe), so that the ABS or ABSF does not transmit a certain DL control channel and data channel other than a CRS, so that the ABS or ABSF can be protected from strong interference caused by the macro cell. Provided that Primary Synchronization Sequence (PSS), Secondary Synchronization Sequence (SSS), Physical Broadcast Control Channel (PBCH), System Information Block Type 1 (SIB1), Paging, Positioning Reference Signal (PRS) are identical to the above-mentioned ABS, the above-mentioned information is transmitted through the ABS. In addition, if the ABS is identical to a Multicast broadcast single frequency network (MBSFN) subframe configured to transmit no signal in the data region, CRS is not transmitted in the data region of the ABS.

Figure 13:
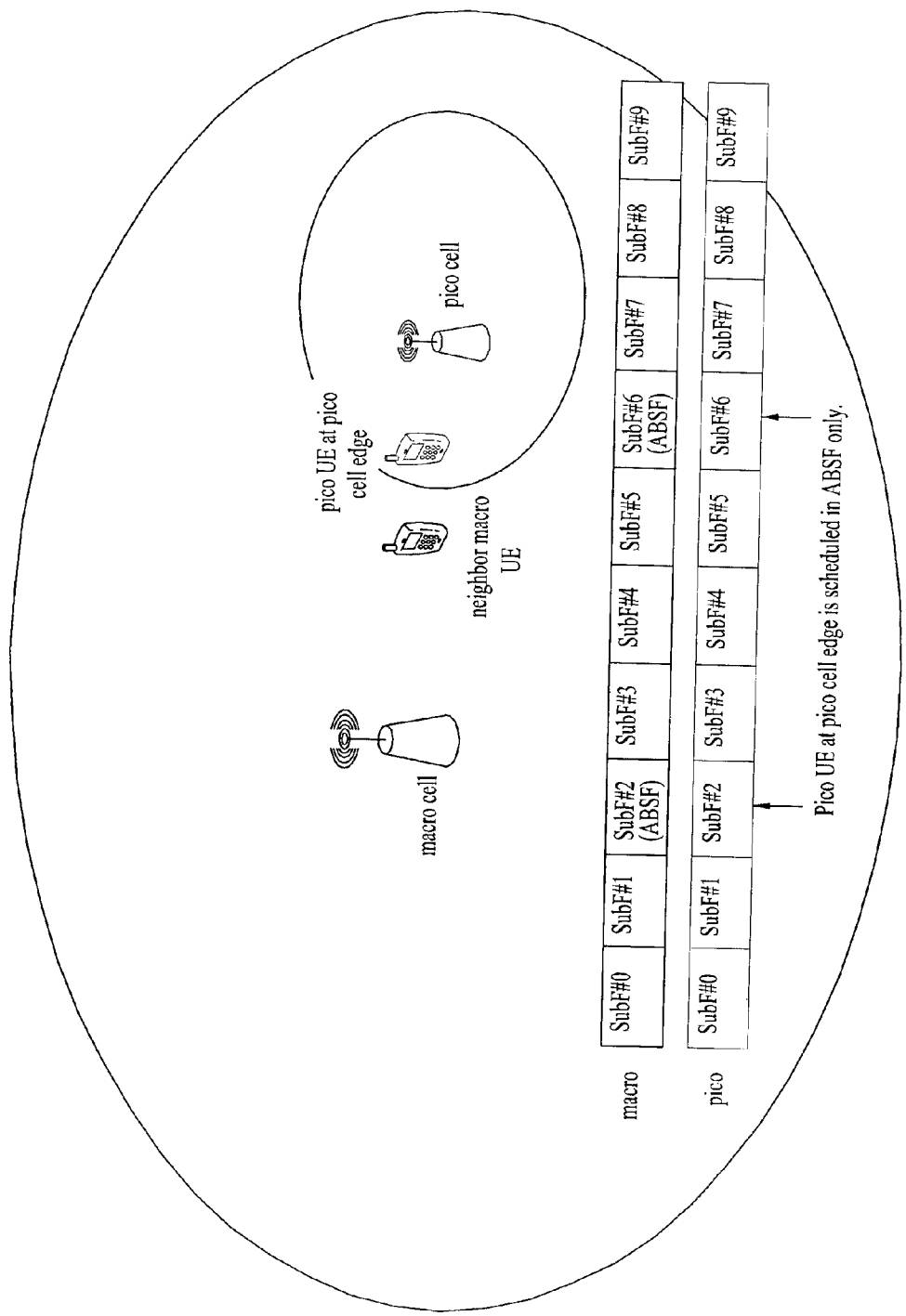
FIG. 13 exemplarily shows an Almost Blank Subframe (ABS) for use in a macro cell under a macro-pico network.

FIG. 13 exemplarily shows an Almost Blank Subframe (ABS) for use in a macro cell under a macro-pico network.

Referring to FIG. 13, the macro cell allows each of subframes #2 and #6 to be composed of an ABSF, and such information may be indicated for a pico cell through a backhaul. The pico cell can schedule a pico UE (that is served by a pico cell) on the basis of information received from the macro cell. Specifically, the pico cell may schedule a plurality of UEs located at a boundary of the macro cell and the pico cell within the ABSF only. That is, the pico UE may perform CSI measurement only in ABSFs.

In order to prevent an unnecessary radio link failure (RLF) as well as to correctly measure a Reference Signal Received Power (RSRP), a Reference Signal Received Quality (RSRQ), etc., the interfered UE is configured to perform Radio Link Monitoring (RLM)/Radio Resource Management (RRM) at subframe(s) limited by the serving cell. For this purpose, although bitmap signaling (for example, 1 denotes ABS and 0 denotes the remaining frames) having the same period as that of backhaul signaling can be used, a pattern must be configured independently from the backhaul bitmap pattern.

The legacy ICIC technologies have difficulty in overcoming the same co-channel interference, so that two scenarios (i.e., a CSG scenario and a pico scenario) are proposed. The CSG scenario and the pico scenario relate to exemplary network structures for describing the basic concept of a time-domain ICIC. Of course, the CSG scenario and the pico scenario can also be applied to other network deployment scenarios.

Figure 14:
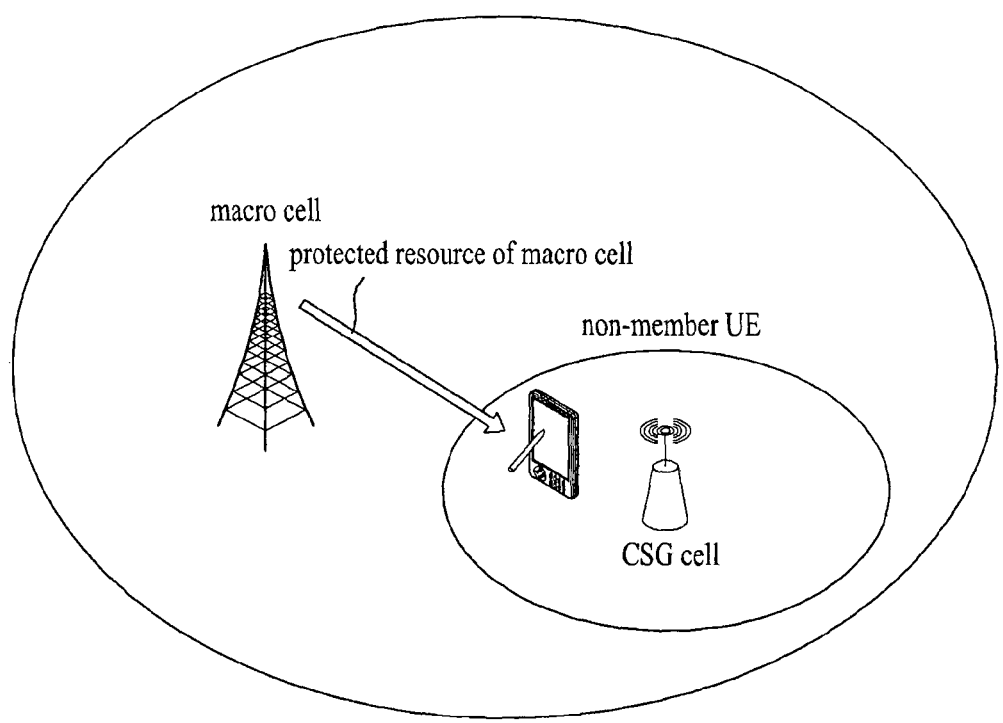
FIG. 14 exemplarily shows a Closed Subscriber Group (CSG) scenario serving as an example of a time-domain Inter-Cell Interference Coordination (ICIC).

FIG. 14 exemplarily shows a Closed Subscriber Group (CSG) scenario serving as an example of a time-domain Inter-Cell Interference Coordination (ICIC).

Referring to FIG. 14, if a UE (hereinafter referred to as a non-member UE) configured to prevent access to the CSG cell approaches a CSG cell, the principal interference state may occur. Due to network deployment and strategy, it may be impossible for the UE affected by inter-cell interference to be diverted to another Evolved Universal Terrestrial Radio Access (E-UTRA) carrier or another Radio Access Technology (RAT) carrier. The time-domain ICIC may be utilized for the non-member UE to be served by the macro cell in the same frequency layer.

If ABSF is used for the CSG cell that can protect the subframe of the corresponding macro cell from interference, the interference can be reduced. The non-member UE may be signaled in a manner that protected resources for RRM, RLM and CSI measurement for the serving macro cell can be used. It may be possible for the non-member UE to continuously receive a service from the macro cell under strong interference from the CSG cell.

In RRC_CONNECTED, the network can recognize that the non-member UE is associated with strong interference from the CSG cell through measurement events defined in LTE Release-8/9, and RRM/RLM/CSI measurement resources may be limited for the UE. In addition, the network may limit RRM measurement resources for a neighbor cell so as to facilitate mobility from the serving macro cell. The network may release RRM/RLM/CSI measurement resources when the UE does not receive serious interference from the CSG cell any longer.

Figure 15:
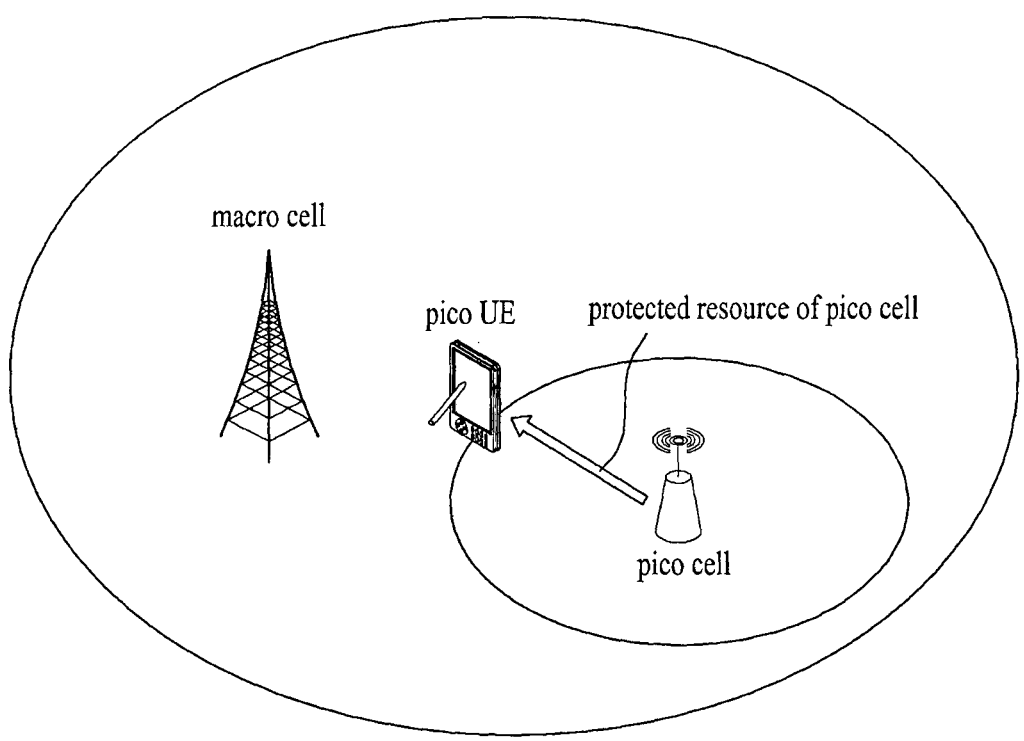
FIG. 15 exemplarily shows a pico scenario serving as a time-domain ICIC.

FIG. 15 exemplarily shows a pico scenario serving as a time-domain ICIC.

Referring to FIG. 15, the time-domain ICIC may be utilized for the pica UE located at a boundary of the serving pico cell (e.g., a UE being traffic-off-loaded from a macro cell to a pico cell). The time-domain ICIC (Inter-Cell Interference Coordination) may be utilized for the above-mentioned UE to receive a service from the pico cell in the same frequency layer. Such interference may be reduced because the macro cell uses the ABSF to protect a subframe of the corresponding pico cell from interference. The pico UE (served by the pico cell) may utilize resources protected for RRM, RLM, and CSI measurement for the serving pico cell. For the pico UE, limitation of RRM/RLM/CSI measurement resources can implement more correct measurement of the pico cell under strong interference from the macro cell. The pico cell may selectively configure limited RRM/RLM/CSI measurement resources for only UEs related to strong interference from the macro cell. In addition, for the UE served by the macro cell, the network may configure RRM measurement resource limitation for a neighbor cell so as to facilitate mobility from the macro cell to the pico cell.

The scheme for transferring subframe pattern (e.g., ABS pattern) information between cells will hereinafter be described in detail.

A cell causing interference may inform another cell receiving the interference of 2 bitmaps through an X2 interface. Each bitmap may have the size of 40 bits, and may represent attributes of each subframe in units of 40 subframes. A first bitmap indicates a subframe including the ABS. That is, the first bitmap may correspond to a specific bitmap in which an ABS is denoted by '1' and the remaining subframes are denoted by '0'. The second bitmap may correspond to a bitmap from among the first bitmaps. The second bitmap indicates a subframe to be established as the ABS at a very high probability. That is, a subframe certainly established as the ABS in the second bitmap may correspond to a subset of the subframe established as an ABS in the first bitmap. Such subset may be used by a receiver so as to configure limited RLM/RRM measurement. The serving cell may indicate actual resources for RLM/RRM and CSI through RRC signaling.

In order to indicate the ABS pattern from the macro cell to the pico cell, a bitmap pattern is used. The period of a bitmap pattern is 40 ms long in the FDD system. The period of a bitmap pattern is 20 ms long in case of UL-DL configurations 1~5 in the TDD system. In case of the UL-DL configuration 0, the period of a bitmap pattern is 70 ms long. In case of the UL-DL configuration 6, the period of a bitmap pattern is 60 ms long.

The bitmap pattern may be semi-statically updated. In this case, update trigger may aperiodically occur or may also occur on the basis of an event.

8. PBCH, PSS, SSS Structure

Figure 16:
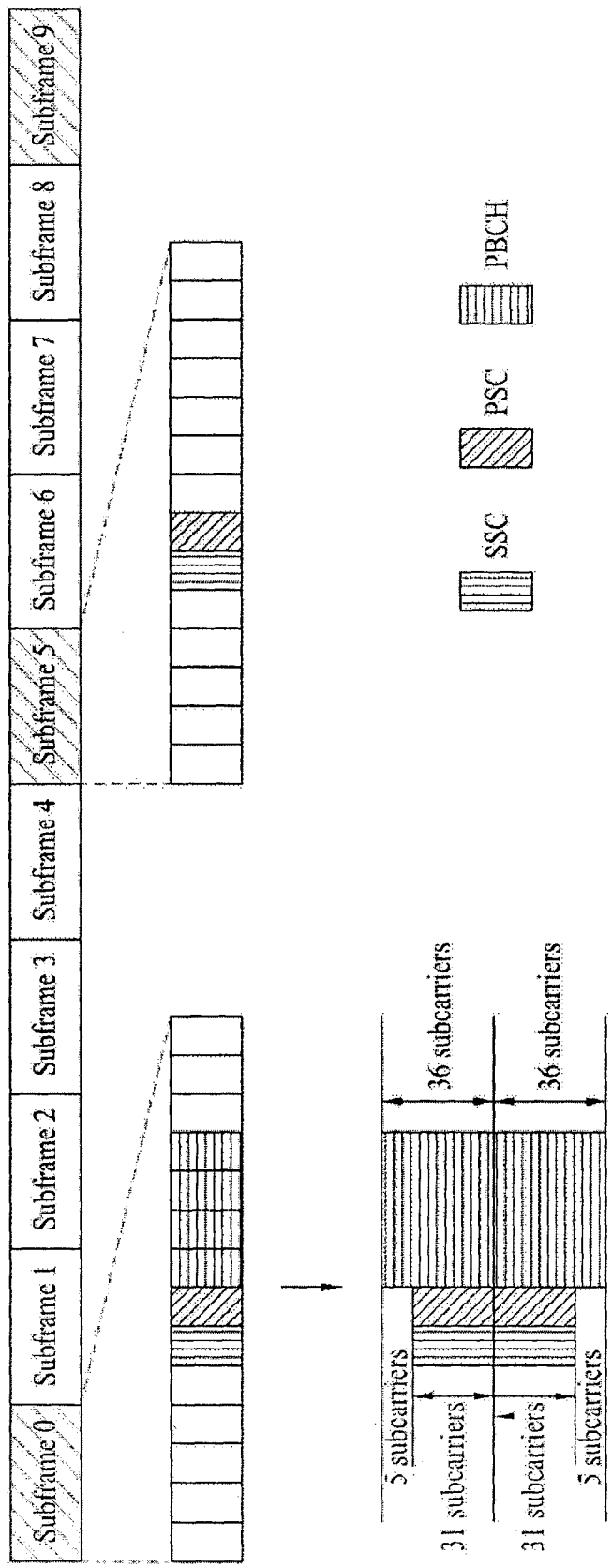
FIG. 16 shows a radio FDD (Frequency Division Duplexing) frame structure for use in the 3GPP LTE system under a normal CP (Cyclic Prefix).

FIG. 16 shows a radio FDD (Frequency Division Duplexing) frame structure for use in the 3GPP LTE system under a normal CP (Cyclic Prefix).

Referring to FIG. 16, the FDD frame is comprised of a total of 10 subframes from the $0^{th}$ subframe to the 9th subframe. In addition, in case of a normal CP, each subframe is comprised of a total of 14 OFDM symbols.

In the FDD frame structure, the $0^{th}$ and $5^{th}$ subframe (subframe #0 and subframe #5 in FIG. 16) are configured to transmit a primary synchronization channel (PSCH) and a secondary synchronization channel (SSCH) for synchronization signals. In addition, the $0^{th}$ subframe may be configured to transmit not only the synchronization signal but also a physical broadcast channel (PBCH). Therefore, the $0^{th}$ subframe for use in the system may be configured to transmit SSCH, PSCH, and PBCH, and the $5^{th}$ subframe may be configured to transmit the SSCH and PSCH. Specifically, the $5^{th}$ OFDM symbol is an OFDM symbol for SSCH transmission at each of the $0^{th}$ and $5^{th}$ subframes, the $6^{th}$ OFDM symbol is an OFDM symbol for PSCH transmission, and each of the $7^{th}$ to $10^{th}$ OFDM symbols is an OFDM symbol for PBCH transmission at the $0^{th}$ subframe.

Meanwhile, in case of a normal CP, if each subframe is an extended CP in a radio FDD frame structure of the 3GPP LTE system, each subframe is comprised of a total of 12 OFDM symbols. In the FDD frame structure, the $0^{th}$ and $5^{th}$ subframes are configured to transmit a primary synchronization channel (PSCH) and a secondary synchronization channel (SSCH). Primary Synchronization Signal (PSS) may be used to acquire time-domain synchronization and/or frequency-domain synchronization such as OFDM symbol synchronization, slot synchronization, etc. Secondary Synchronization Signal (SSS) may be used to acquire frame synchronization, cell group ID and/or cell CP configuration (i.e., utilization information of a normal CP or extended CP). Each of PSS and SSS may be transmitted at two OFDM symbols of each radio frame. In addition, PSS and SSS are transmitted on 6 RBs (i.e., 3 left RBs and 3 right RBs) arranged on the basis of a DC subcarrier within the corresponding OFDM symbol. PSS is transmitted at the last OFDM symbol (i.e., the $6^{th}$ OFDM symbol in case of a normal CP, or the $5^{th}$ OFDM symbol in case of an extended CP) of a first slot (i.e., Slot 0 or Slot 10) of the $0^{th}$ or $5^{th}$ subframe within the 10 ms radio frame using 72 subcarriers (10 subcarriers are reserved, 62 subcarriers are used for PSS transmission). Although SSS has the same frequency and slot allocation as those of PSS as shown in the drawing. SSS is mapped earlier than a PSS by a predetermined time corresponding to one symbol.

Cell search is performed using the above-mentioned PSS/SSS. The cell search may be performed to obtain time and frequency synchronization with the cell and a physical layer cell ID (PCI) of the corresponding cell. In a PSS detection procedure, a cell identity within a cell identity group can be detected. In the SSS detection procedure, the cell identity group can be detected.

In addition, the $0^{th}$ subframe may be configured to transmit not only a synchronization signal but also a PBCH (Physical Broadcast Channel). The content of the PBCH message is denoted by a master information block (MIC) in the RRC layer. In, the PBCH, BCH may include a DL system bandwidth (dl-Bandwidth or DL BW), PHICH configuration, and system frame number (SFN). Accordingly, the UE receives a PBCH so that it can explicitly recognize DL BW, SFN, and PHICH configuration information. Meanwhile, the UE can implicitly recognize the number of transmission (Tx) antenna ports of the BS upon receiving a PBCH. Information about the number of transmission antennas of the base station (BS) can be implicitly signaled because a 16-bit CRC used for PBCH error detection is masked (e.g., XOR-operated) with a sequence corresponding to the number of transmission antennas. Cell-specific scrambling, modulation, layer-mapping, and precoding are performed on a PBCH, so that the precoded result is mapped to physical resources.

Therefore, in the system, the $0^{th}$ subframe is configured to transmit SSCH, PSCH and PBCH, and the $5^{th}$ subframe is configured to transmit SSCH and PSCH. Specifically, in the $0^{th}$ and $5^{th}$ subframes, the $4^{th}$ OFDM symbol is an OFDM symbol for SSCH transmission, and the $5^{th}$ OFDM symbol is an OFDM symbol for PSCH transmission. In the $0^{th}$ subframe, $6^{th}$ to $9^{th}$ OFDM symbols are used to transmit a PBCH.

When powered on or when entering a new cell, a UE performs initial cell search. The initial cell search involves synchronization with a BS. Specifically, the UE synchronizes with the BS and acquires a cell Identifier (ID) and other information by receiving a Primary Synchronization Channel (PSS) and a Secondary Synchronization Channel (SSS) from the BS. Then the UE may acquire information broadcast in the cell by receiving a Physical Broadcast CHannel (PBCH) from the BS.

After initial cell search, the UE may acquire more specific system information by receiving a Physical Downlink Control CHannel (PDCCH) and receiving a Physical Downlink Shared CHannel (PDSCH) based on information of the PDCCH. After the above-mentioned procedure, the UE may receive a PDCCH/PDSCH and transmit a PUSCH)/PUCCH in a general uplink/downlink signal transmission procedure. Control information that the UE transmits to the BS through uplink or another control information that the UE receives from the BS may include a DL/UL ACK/NACK signal, Channel Quality Indictor (CQI), a Precoding Matrix Index (PMI), a scheduling request (SR), and a Rank Indicator (RI). CQI, PMI and RI may also be referred to as Channel State Information (CSI).

9. Example of Almost Blank Subframe (ABS)

Figure 17:
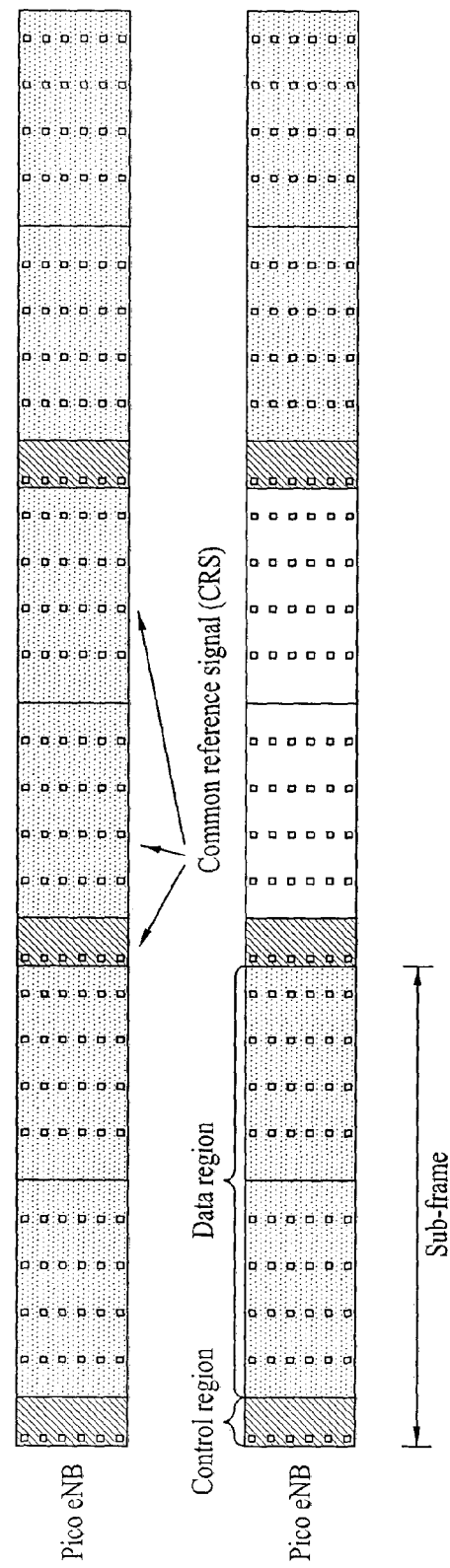
FIG. 17 exemplarily shows an Almost Blank Subframe (ABS) based on the concept of FIG. 13.

FIG. 17 exemplarily shows an Almost Blank Subframe (ABS) based on the concept of FIG. 13.

FIG. 17 exemplarily shows influence of DL environment mutual interference in a heterogeneous network structure. As can be seen from FIG. 17, the macro UE located at an outer region of the pico BS (or pico eNB) may be seriously interfered by the pico BS. In this case, the corresponding macro UE is handed over to the pico BS through CRE execution. However, the macro UE is still interfered by the macro BS. In addition, the pico UE served by the legacy pico BS is also interfered by the macro BS, so that it is impossible for the pico UE to detect a desired signal. In conclusion, the best method for enabling the macro BS not to generate interference in radio resources used by a UE located at an outer region of the pico BS is to empty the corresponding subframe. Based on the above-mentioned concept, ABS technology has been achieved. In accordance with the ABS technology, a specific period in which the macro BS does not transmit data is constructed, the pico BS can allow its own outer UEs to be scheduled into the corresponding subframe through exchanging the constructed information between base stations or eNBs, so that the occurrence of interference can be prevented.

Figure 18:
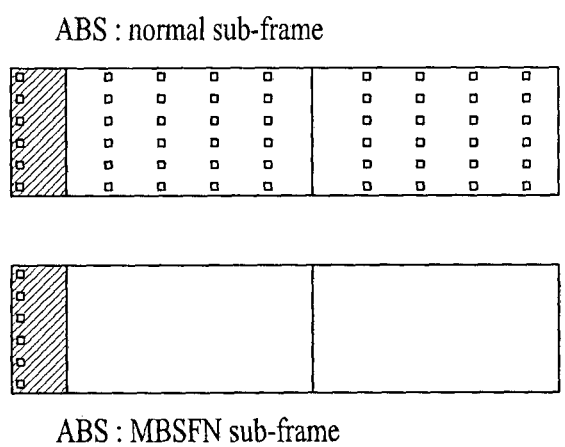
FIG. 18 shows two kinds of ABS.

FIG. 18 shows two kinds of ABS. Referring to FIG. 18, if a normal subframe for the ABS is used, a Common Reference Signal (CRS) is still transmitted. Therefore, influence of CRC interference still remains. In contrast, in case of multicast/broadcast over a single frequency network (MBSFN), CRC is not transmitted in the data region so that influence of interference caused by CRC can be greatly reduced. However, the use of MBSFM subframe may be limited, so that the ABS pattern is configured and used in consideration of characteristics of a normal subframe and an MBSFN subframe. The corresponding technology can also be applied to an UL environment.

10. Subframe Shift and Symbol Level Shift

Figure 19:
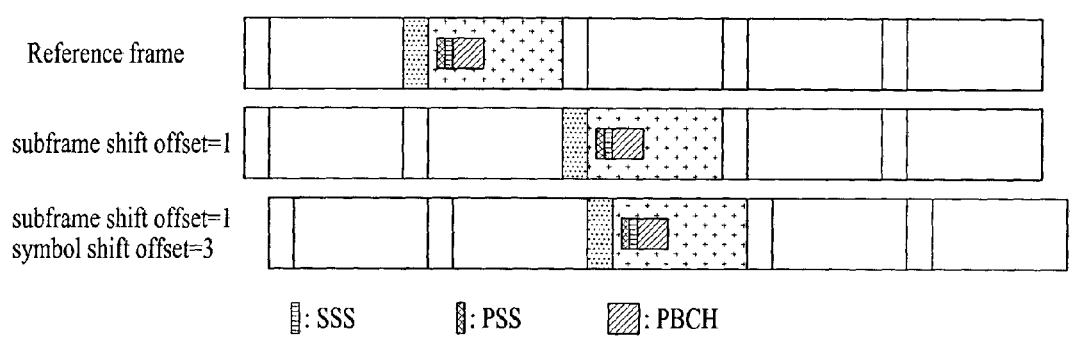
FIG. 19 exemplarily shows a subframe shift and a symbol level shift.

FIG. 19 exemplarily shows a subframe shift and a symbol level shift.

Referring to FIG. 19, in case of an ABS used for preventing interference in the heterogeneous network, a variety of signals (PSS, SSS, PBCH, paging, SIB1 signals) corresponding to a common channel can also be used to transmit data or information in the corresponding ABS subframe. Therefore, the corresponding signals may generate mutual interference in the heterogeneous network situation, so that it may be impossible to perform UE access. FIG. 19 shows a symbol-level shift for interference reduction related to a subframe shift and control region for preventing mutual interference among PSS, SSS and PBCH. As can be seen from FIG. 19, if one subframe is shifted, the position among PSS, SSS and PBCH deviates from the time domain, the mutual corresponding subframe may be determined to be an ABS or the mutual corresponding resource is muted so that interference reduction can be achieved.

Provided that only one subframe shift is used, overlay control regions may unavoidably occur, so that interference related to the control channel is still serious.

In FIG. 19, if the symbol level shift (assuming that the control region is composed of 3 OFDM symbols) is performed after completion of the subframe shift, the corresponding three OFDM symbols may be muted or the corresponding subframe may be established as the ABS, so that interference caused by the control region can be reduced.

Figure 20:
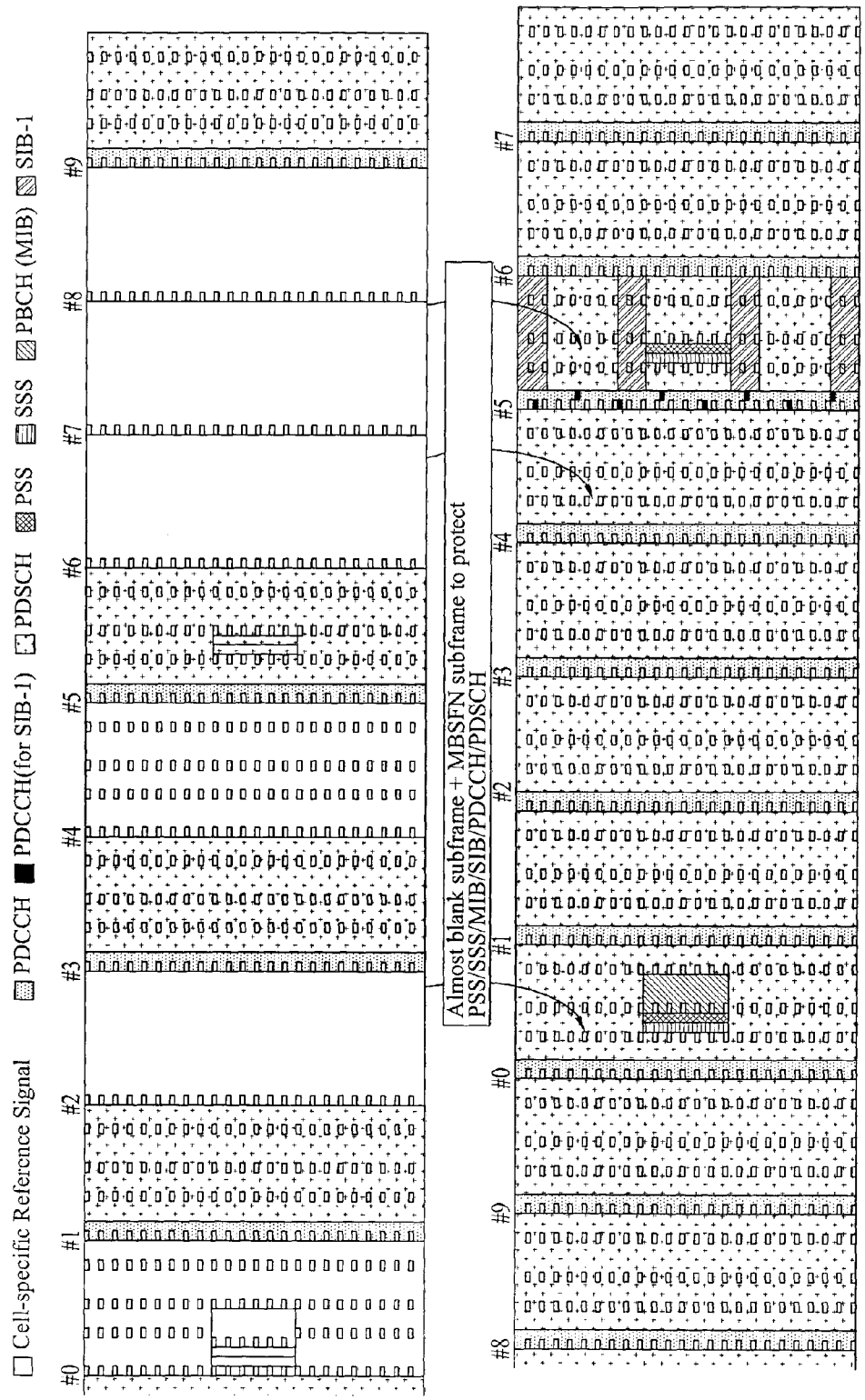
FIG. 20 exemplarily shows an ABS, a subframe shift, and a symbol level shift.

FIG. 20 exemplarily shows an ABS, a subframe shift, and a symbol level shift. In more detail, FIG. 20 shows 2-subframe-shift for reducing interference of the above-mentioned common channels and a 3-OFDM-symbol-shift for protecting the control region, and also shows a frame structure in which a normal subframe and an MBSFN subframe for use in the BS corresponding to an aggressor are allocated to the ABS so that interference can be greatly reduced.

11. Scheme for Synchronization 11.1. Inter-Cell Interference Coordination

As can be seen from the above-mentioned heterogeneous network condition, the ABS technology is used to ICIC. In a non-CSG environment based on the ABS technology, UE measurement related to the corresponding neighbor cell must be performed in such a manner that the macro cell located in the vicinity of the pico cell can be handed over the pico cell or can perform CRE to the pico cell using the UE measurement result. For this purpose, it is necessary to first detect a synchronization channel of a neighbor cell. However, it may be difficult to correctly detect PSS/SSS from the pico cell due to PSS and SSS interference derived from the macro cell. As can be seen from TS36.133, a synchronization-channel related requirement (the ratio of the transmit energy per PN chip of the SCH to the total transmit power spectral density) has values of −4 dB~−6 dB according to inter-frequency measurement, intra-frequency measurement or secondary component carrier measurement. Therefore, as can be seen from FIG. 11, assuming that the UE configured to perform CRE or handover determines a smaller value than the corresponding request to be a CRE or handover biasing value, it is impossible to detect the synchronization channel of the neighbor cell so that it may be impossible to measure a neighbor cell.

Accordingly, the present invention proposes the following methods to acquire timing synchronization from the neighbor cell as in the corresponding pico cell.

11.2. Reception of Network Additional Data According to the Present Invention

If it is impossible to detect PSS/SSS, synchronization can be acquired using the CRS of the neighbor cell. However, it is impossible to recognize system information over a BCH of the neighbor cell, so that at least one of the following additional data is needed when synchronization is performed using the CRS.

(1) System bandwidth is needed for predicting the number of used RBs and the number of transmitted CRSs.

(2) Physical cell ID) & v-shift are needed for predicting a CRS sequence and a CRS pattern.

(3) Configuration of the number of antenna ports is needed for predicting a CRS pattern.

(4) MBSFN configuration is needed when the ABS of the macro cell performs synchronization using the pico CRS so as to stably detect the pico-cell CRS.

(5) The number of subframes and the number of slots are needed for detecting. the correct CRS based on the number of subframes and the number of slots on the basis of one reference cell.

(6) Timing different offset is needed for synchronization related to transmission synchronization errors.

(7) "Search window size and/or starting point" are needed for acquiring not only information about an arbitrary start point calculated by the network but also information about synchronization generated from a CRS propagation delay within the search window range, when synchronization is performed using CRC-based correlation.

The legacy OTDOA may refer to the design of additional data (signaled to UE through an LPP) for the neighbor cell, or may perform RRC signaling in the same concept as described above.

11.3. Synchronization Scheme Using CRS

Figure 21:
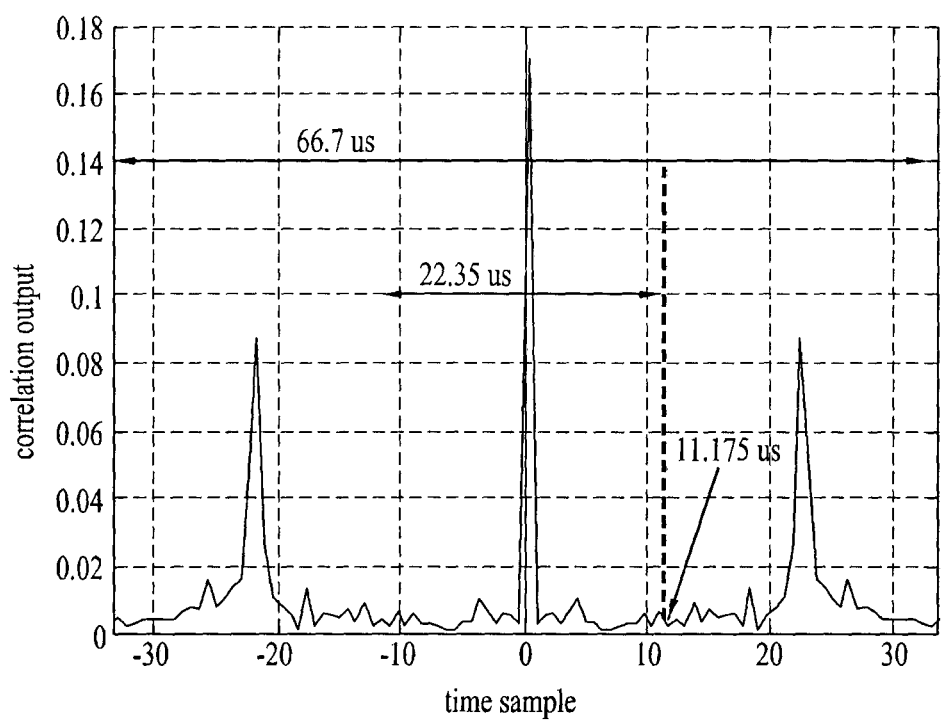
FIG. 21 exemplarily shows autocorrelation based on a common reference signal (CRS) planted at intervals of three spaces in a frequency domain.

FIG. 21 exemplarily shows autocorrelation based on a common reference signal (CRS) planted at intervals of three spaces in a frequency domain.

Referring to FIG. 21, when using two antenna ports, CRS is used as spacing (or interval) of 3 subcarriers, so that three peaks occur as shown in FIG. 10 when synchronization is performed in the time domain. A center peak point is used as a reference for synchronization. Thus, in order to solve the ambiguous problem of the remaining peaks, the search window size must be set to about 11.175 us or less (compared to a reference point), so that it can prevent at least one peak from occurring in a single search window using 66.67 us/3 as a single value. In this case, 66.7 us is a duration of 1 OFDM symbol (other than a CP).

11.4. Obtain Synchronization Using Additional Configured Signal or Channel Other than Legacy PSS/SSS According to the Present Invention In order to solve interference problem between PSS and SSS in a heterogeneous network condition, the ABS-technology based subframe shift scheme is proposed as shown in FIG. 20. However, if the MBSFN subframe is configured and used in the FDD, the same subframe synchronization is needed, so that a method for employing the subframe shift scheme may be restricted. In addition, if different UL/DL configurations are configured in the TDD situation, the subframe shift may cause strong interference between subframes due to UL/DL mismatching. Therefore, the present invention proposes an additional signaling method for solving the above-mentioned restriction condition and at the same time performing synchronization.

In the heterogeneous network (macro-pico) environment based on the ABS technology 9, the macro UE located in the vicinity of the pico cell synchronizes with the pico cell acquires synchronization of the pico cell, so that it can perform UE measurement using the acquired synchronization information. In case of PSS and SSS, if the subframe shift is not present, it is impossible to avoid mutual interference so that there is difficulty in acquiring synchronization of the pico cell. In this case, the macro BS may plant additional signals for synchronization acquisition of the corresponding UE into the OFDM symbol having no CRS of the corresponding pico subframe of an ABS-configured subframe, and may configure the planted result, so that it can obtain synchronization of the pico cell.

11.4.1. Use of SSS Acting as Additional Signal

In the embodiments of the present invention, SSS is used as an additional signal in the FDD mode. The present invention can propose why the SSS but not the PSS is used as additional signals PSS is allocated earlier than the SSS. The SSS can detect a cell identify (cell ID) group.

Figure 22:
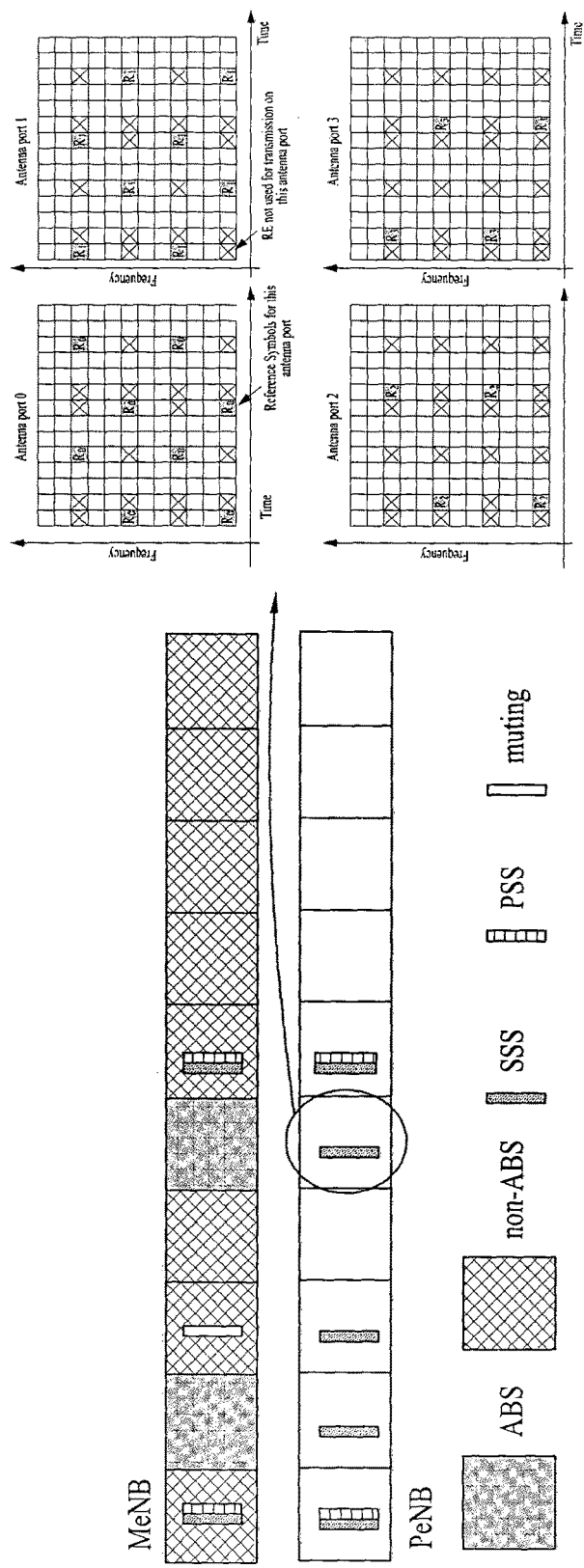
FIG. 22 exemplarily shows synchronization acquisition using additional signals.

FIG. 22 exemplarily shows synchronization acquisition using additional signals.

Referring to FIG. 22, it may be difficult to detect PSS and SSS of the pico cell due to interference of the macro cell. As a result, the additional signal corresponding to the SSS is planted into the pico cell as shown in FIG. 22, so that synchronization acquisition may be achieved. Since strong interference is generated from the macro cell, the corresponding additional signal (SSS) is located at a subframe established as 'ABS' in the macro BS. If the corresponding pico BS not established as 'ABS' transmits the SSS in the subframe of the BS, there is a need for the macro BS corresponding to SSS transmission resources to perform muting of the resources. In addition, the ABS has difficulty in avoiding interference from the macro CRS. Accordingly, if the data region of a subframe corresponding to either an OFDM symbol having no CRS or an MBSFN-configured ABS is used in the subframe of the pico cell corresponding to the macro-cell ABS, synchronization acquisition can be stably achieved. For example, if an antenna port is set to 2, SSS can be transmitted without receiving interference from the CRS at some symbols #1, #2, #3, #5, #6, #8, #9, #10, #12 and #13 from among symbols #0-#13, so that synchronization can be efficiently performed. If the antenna port is set to 4, the corresponding symbol number can be sent at symbols #2, #3, #5, #6, #9, #10, #12, #13 without causing CRS interference. One or more corresponding additional signals can be transmitted within one subframe, and associated transmission format may be based on SSS and reuse a new design or legacy signals. If SSS or the like is configured as shown in FIG. 22, synchronization acquisition errors caused by the legacy SSS can be distinguished from each other due to fixed symbol positions of two legacy SSSs. Therefore, assuming that information exchange or previous acquisition through an X2 interface (or S1 interface) between the base stations is achieved, the UE requires the following assistant data (1) and (2).

1) If SSS is used in the embodiment, additional signal information can be obtained when SSS signal information is provided. In addition, when acquiring the legacy UE synchronization, an SSS but not a PSS is used for solving the ambiguity problem. Legacy common channels may be used as shown in the above-mentioned embodiment, and a new signal may be defined and used.

) Configuration information & location information of Additional Signal: Additional signal configuration may be achieved through higher layer signaling (e.g., RRC signaling). In case of the corresponding configuration, the signal position information is fixed to a fixed format, so that the presence or absence of a signal at the corresponding position can be indicated using the on/off format of the corresponding signal. In addition, the semi-static or dynamic-type signal position information can be indicated using a plurality of bits.

11.4.2. Method for Acquiring Synchronization Using Interference Cancellator

Figure 23:
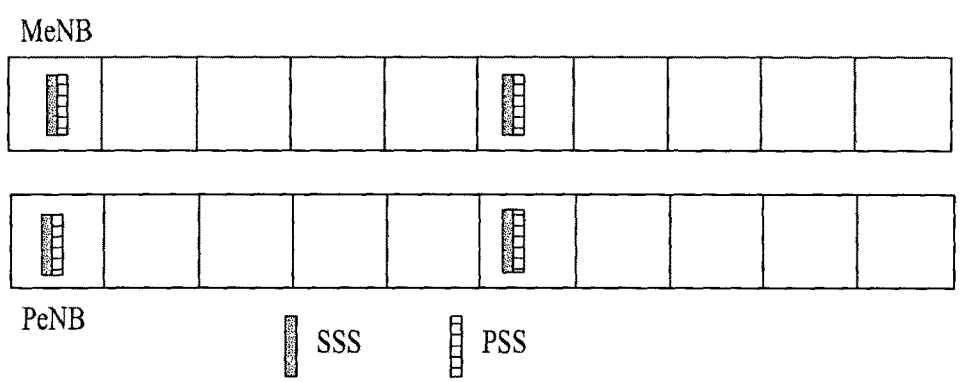
FIG. 23 shows mutual interference environment of a synchronous channel in a heterogeneous network.

FIG. 23 shows mutual interference environment of a synchronous channel in a heterogeneous network.

Referring to FIG. 23, the UE, that is located at a cell boundary of the legacy pico cell and receives a service from the macro cell, is unable to directly detect a synchronization channel because the strength of a signal from the pico cell is relatively lower than that of the macro synchronization channel. However, assuming that there is a large difference between both signals (i.e., if a handover or CRE biasing value is high), after a synchronization channel is acquired from the macro cell, if the corresponding signals are cancelled from the reception signal using the estimated desired channel and the detected SSs, only synchronization channels of neighbor cells (i.e., pico cells) remain. Therefore, a neighbor synchronization channel can be acquired using the non-coherent detection or coherent detection scheme.

(1) The macro UE detects a macro PSS, a pico PSS, and a PSS of a reception signal having noise using the non-coherent detection scheme. In this case, a physical layer ID is set to one of three IDs.

(2) The macro UE estimates a channel between the pico BS and the UE using not only the PSS obtained from the procedure (1) but also channel information.

(3) In the simultaneously received SSS channels, both SSSs can be detected using channel estimation information obtained (or pre-obtained) independently from the procedures (1) and (2).

(3-1) In the method (3), after the SSS is obtained using macro-UE channel information estimated for macro SSS detection, the macro SSS is removed from the entire reception signal, and the SSS of the pico BS is cancelled.

(3-2) In the order or method of such cancellation, all cancellation methods based on the above-mentioned CRE or handover-large biasing value can be applied to the present invention.

Besides the above-mentioned methods, even in the case of using a cell ID of a cell adjacent to the network or SS-related sequence information, a synchronization channel can be acquired through direct cancellation.

12. Apparatus Applicable to the Present Invention

Figure 24:
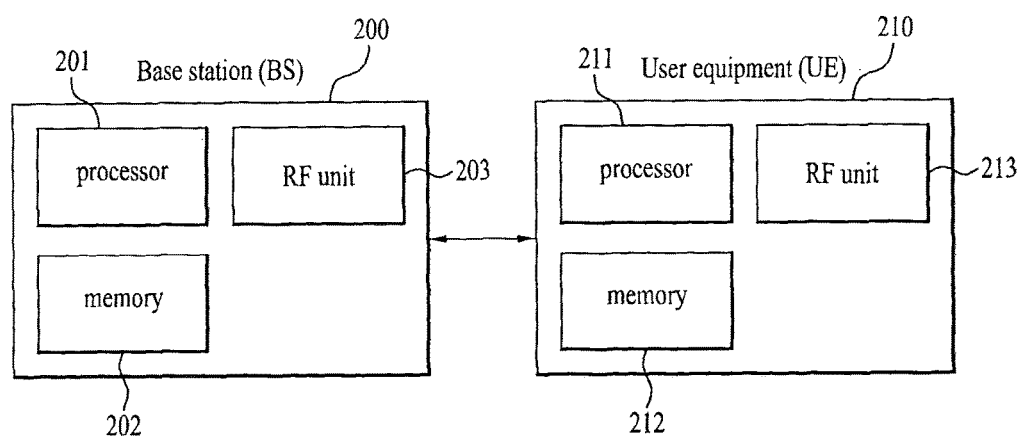
FIG. 24 is a block diagram illustrating a wireless communication apparatus according to an embodiment of the present invention.

FIG. 24 is a block diagram illustrating a wireless communication apparatus according to an embodiment of the present invention.

Referring to FIG. 24, the wireless communication system includes a base station (BS) 200 and a plurality of UEs 210 located in the BS region 200.

The BS 200 includes a processor 201, a memory 202, and a radio frequency (RF) unit 203. The processor 201 may be constructed to implement the procedures and/or methods disclosed in the embodiments of the present invention. Layers of the radio interface protocol may be implemented by the processor 201. The memory 202 may be connected to the processor 201, and store various information related to operations of the processor 201. The RF unit 203 is connected to the processor 201, and transmits and/or receives RF signals.

The UE 210 includes a processor 211, a memory 212, and an RF unit 213. The processor 211 may be constructed to implement the procedures and/or methods disclosed in the embodiments of the present invention. Layers of the radio interface protocol may be implemented by the processor 211. The memory 212 may be connected to the processor 211, and store various information related to operations of the processor 211. The RF unit 213 is connected to the processor 211, and transmits and/or receives RF signals.

The memory 202 or 212 may be located inside or outside the processor 201 or 211, and may be connected to the processor 201 or 211 through various well known means. In addition, the BS 200 and/or the UE 210 may have a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

MODE FOR INVENTION

Various embodiments have been described in the best mode for carrying out the invention.

INDUSTRIAL APPLICABILITY

Although the method for transmitting and receiving data in a wireless access system according to the embodiments of the present invention has been disclosed on the basis of only the 3GPP LTE system application, it should be noted that the embodiments are also applicable not only to an 3GPP LTE system but also to other wireless access systems.

The invention claimed is:

1. A method for performing synchronization with a neighbor base station (BS) of a user equipment (UE) in a wireless access system, the method comprising:
when the UE based on a macro BS is located at a boundary of the neighbor BS, receiving, by the UE, a primary synchronization signal (PSS) and a secondary synchronization signal (SSS) of the neighbor BS interfered by a PSS and a SSS of the macro BS through subframe #0 and subframe #5;
receiving, by the UE, an additional synchronization signal (SS) of the neighbor BS in a subframe corresponding to an almost blank subframe (ABS) of the macro BS when information indicating a presence of the additional SS is received;
performing, by the UE, synchronization with the neighbor BS using the PSS and the SSS of the neighbor BS interfered by the PSS and the SSS of the macro BS and the additional SS of the neighbor BS,
wherein the subframe corresponding to the ABS of the macro BS is other than the subframe #0 and the subframe #5,
wherein the additional SS is received in a fixed position in the subframe corresponding to the ABS of the macro BS,
wherein the fixed position is one of symbols #2, #3, #5, #6, #9, #10, #12 and #13 among symbols #0 to #13 in the subframe corresponding to the ABS of the macro BS, and
wherein the additional SS of the neighbor BS is different from the PSS or the SSS of the neighbor BS.

2. The method according to claim 1, wherein the subframe corresponding to the ABS of the macro BS has no Common Reference Signal (CRS).

3. A user equipment (UE) for acquiring synchronization with a neighbor base station (BS) in a wireless access system, the user equipment (UE) comprising:
a processor configured to receive a primary synchronization signal (PSS) and a secondary synchronization signal (SSS) of the neighbor BS interfered by a PSS and a SSS of a macro BS through subframe #0 and subframe #5, when the UE based on the macro BS is located at a boundary of the neighbor BS,
the processor configured to receive an additional synchronization signal (SS) of the neighbor BS in a subframe corresponding to an almost blank subframe (ABS) of the macro BS when information indicating a presence of the additional SS is received; and
the processor configured to perform synchronization with the neighbor BS using the PSS and the SSS of the neighbor BS interfered by the PSS and the SSS of the macro BS and the additional SS of the neighbor BS,
wherein the subframe corresponding to the ABS of the macro BS is other than the subframe #0 and the subframe #5,
wherein the additional SS is received in a fixed position in the subframe corresponding to the ABS of the macro BS,
wherein the fixed position is one of symbols #2, #3, #5, #6, #9, #10, #12 and #13 among symbols #0 to #13 in the subframe corresponding to the ABS of the macro BS, and
wherein the additional SS of the neighbor BS is different from the PSS or the SSS of the neighbor BS.

4. The user equipment (UE) according to claim 3, wherein the subframe corresponding to the ABS of the macro BS has no Common Reference Signal (CRS).

* * * * *